(12) United States Patent
Geens et al.

(10) Patent No.: US 12,276,856 B2
(45) Date of Patent: Apr. 15, 2025

(54) SPLICE ENCLOSURE WITH CONNECTORIZED PATCHING FUNCTIONALITY

(71) Applicant: COMMSCOPE TECHNOLOGIES LLC, Hickory, NC (US)

(72) Inventors: Johan Geens, Bunsbeek (BE); Philippe Coenegracht, Hasselt (BE); Samory De Zitter, Mechelen (BE); Roel Modest Willy Bryon, Aarschot (BE)

(73) Assignee: CommScope Technologies LLC, Claremont, NC (US)

( * ) Notice: Subject to any disclaimer, the term of this patent is extended or adjusted under 35 U.S.C. 154(b) by 133 days.

(21) Appl. No.: 17/923,354

(22) PCT Filed: May 6, 2021

(86) PCT No.: PCT/US2021/031121
§ 371 (c)(1),
(2) Date: Nov. 4, 2022

(87) PCT Pub. No.: WO2021/226355
PCT Pub. Date: Nov. 11, 2021

(65) Prior Publication Data
US 2023/0204888 A1    Jun. 29, 2023

Related U.S. Application Data

(60) Provisional application No. 63/124,755, filed on Dec. 12, 2020, provisional application No. 63/020,975, filed on May 6, 2020.

(51) Int. Cl.
*G02B 6/44* (2006.01)

(52) U.S. Cl.
CPC ......... *G02B 6/4444* (2013.01); *G02B 6/4454* (2013.01)

(58) Field of Classification Search
None
See application file for complete search history.

(56) References Cited

U.S. PATENT DOCUMENTS

| 4,538,487 A * | 9/1985 | Hatfield ................. H02G 1/126 81/9.51 |
| 11,892,696 B2 * | 2/2024 | Geens ................. G02B 6/4454 |
| 2006/0083475 A1 | 4/2006 | Grubish et al. |

(Continued)

FOREIGN PATENT DOCUMENTS

| WO | 2012/007904 A1 | 1/2012 |
| WO | 2012/007905 A1 | 1/2012 |

(Continued)

OTHER PUBLICATIONS

International Search Report and Written Opinion of the International Searching Authority for International Patent Application No. PCT/US2021/031121 mailed Aug. 27, 2021, 10 pages.

(Continued)

*Primary Examiner* — Jerry Rahll
(74) *Attorney, Agent, or Firm* — Merchant & Gould P.C.

(57) ABSTRACT

The present disclosure relates a telecommunication enclosure having a compact configuration. In one example, the telecommunication enclosure supports both optical splicing and connectorized patching.

19 Claims, 36 Drawing Sheets

(56) References Cited

U.S. PATENT DOCUMENTS

| | | | |
|---|---|---|---|
| 2008/0170832 A1* | 7/2008 | Mullaney | H02G 15/013 |
| | | | 174/60 |
| 2015/0346449 A1 | 12/2015 | Clatanoff et al. | |
| 2017/0293100 A1 | 10/2017 | Solheid et al. | |
| 2019/0025532 A1 | 1/2019 | Kaplan | |

FOREIGN PATENT DOCUMENTS

| | | | | |
|---|---|---|---|---|
| WO | 2013/131788 A2 | 9/2013 | | |
| WO | 2017/046359 A1 | 3/2017 | | |
| WO | WO-2019160995 A1 * | 8/2019 | ........... | G02B 6/3897 |
| WO | 2019209613 | 10/2019 | | |
| WO | 2020061144 | 3/2020 | | |
| WO | 2021/113109 A1 | 6/2021 | | |

OTHER PUBLICATIONS

OFDC—A4 Outdoor Fiber Distribution Closure, EnLighten FTTH Solutions, Tyco Electronics, 1-2 (2010).
OFDC—C12 Outdoor Fiber Distribution Closure, EnLighten FTTH Solutions, Tyco Electronics, 1-2 (2011).
OFDC—C12 Outdoor Fiber Distribution Closure, CommScope®, 1-2 (2017).
OFDC—C12 Outdoor Fiber Distribution Closure, CommScope®, revised, 1-2 (2017).
OFDC—B8G Outdoor Fiber Distribution Closure, Installation Instructions, CommScope®, 1-8 (May 2019).
European Search Report for EP27199800.4, mailed Apr. 25, 2024.

* cited by examiner

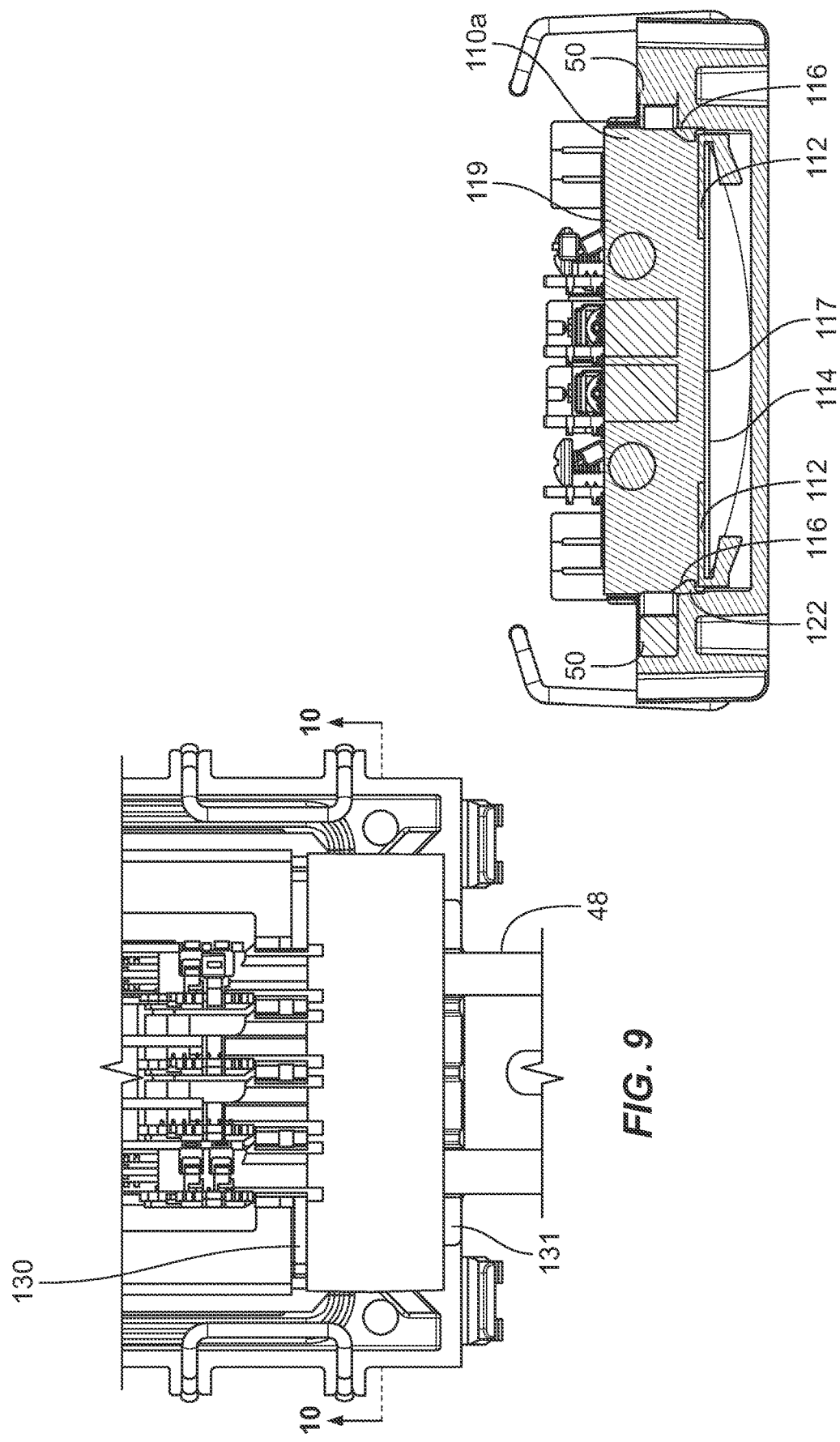

FIG. 27
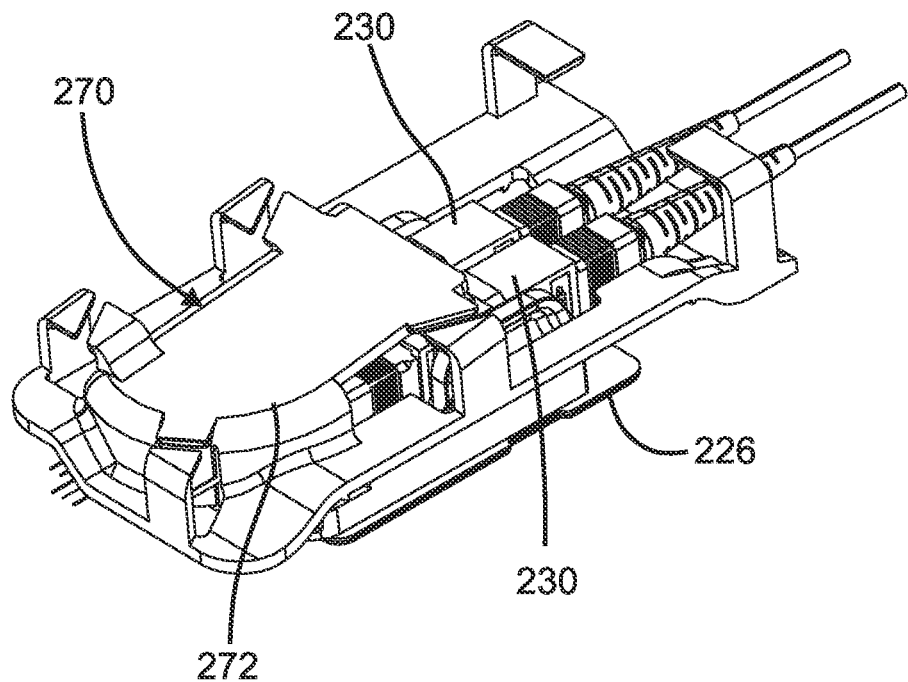
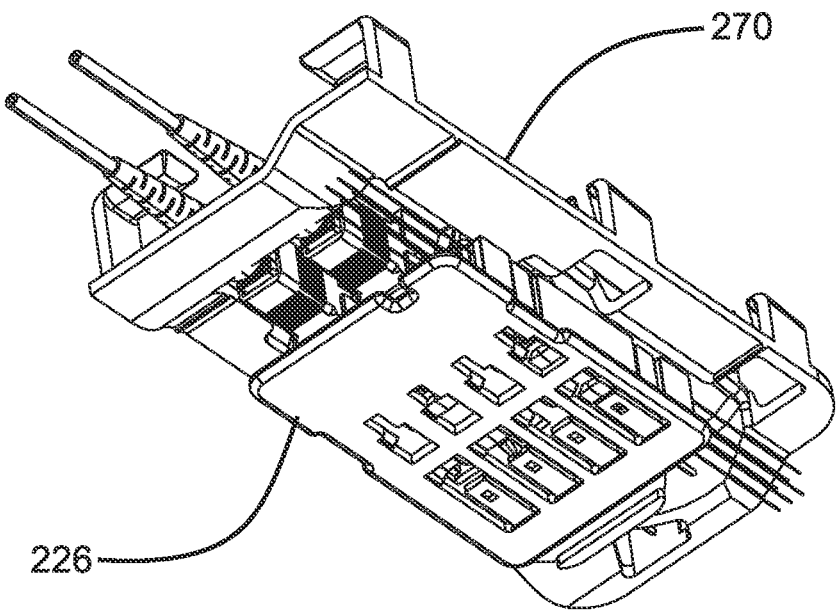
FIG. 28

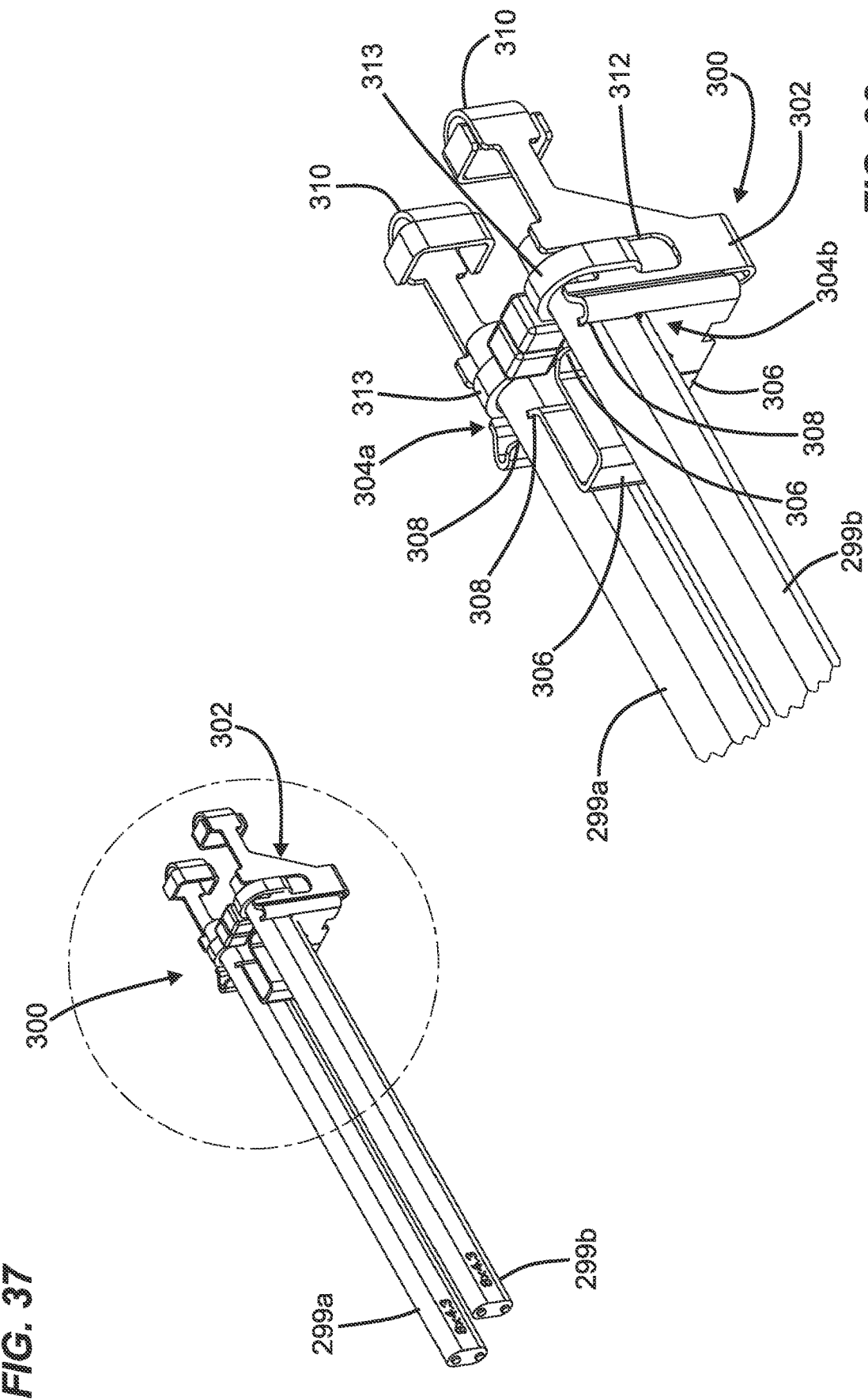

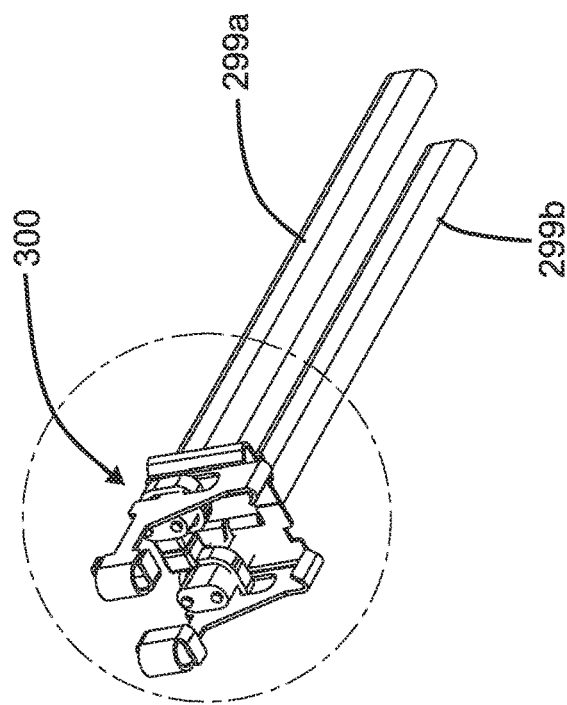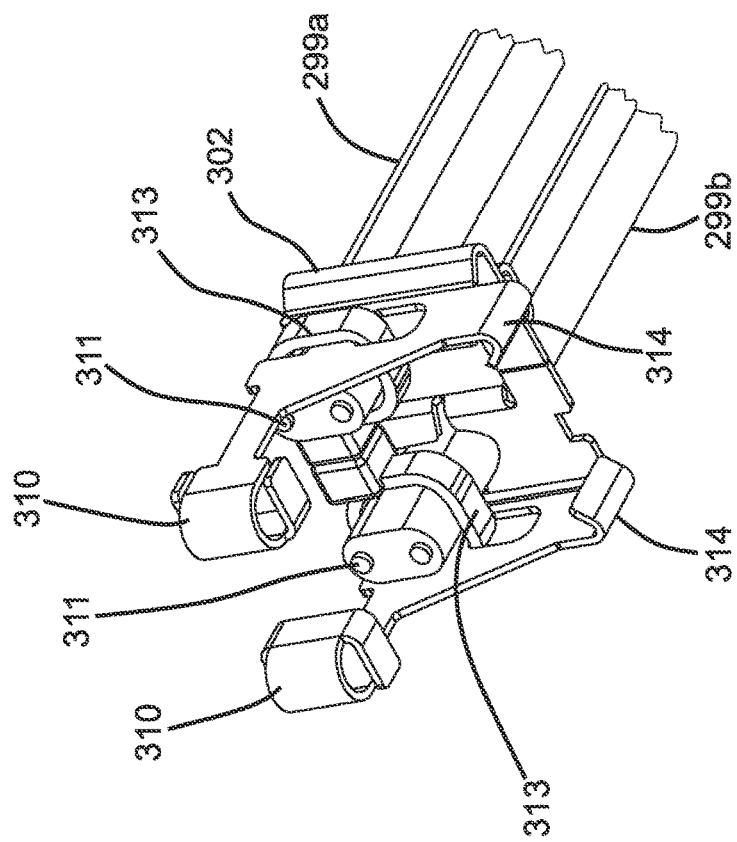

SPLICE ENCLOSURE WITH CONNECTORIZED PATCHING FUNCTIONALITY

CROSS-REFERENCE TO RELATED APPLICATIONS

This application is a National Stage Application of PCT/US2021/031121, filed on May 6, 2021, which claims the benefit of U.S. Provisional Patent Application No. 63/020,975, filed on May 6, 2020 and claims the benefit of U.S. Provisional Patent Application No. 63/124,755, filed on Dec. 12, 2020, the disclosures of which are hereby incorporated by reference in their entireties. To the extent appropriate, a claim of priority is made to the above referenced applications.

BACKGROUND

As demand for telecommunications increases, networks are being extended in more and more areas. In facilities such as single-family homes, multiple dwelling units (MDU's), apartments, condominiums, businesses, etc., boxes are used to provide subscriber access points to a telecommunications network. Cables are also used to interconnect the subscriber access points provided by boxes with subscribers at subscriber locations (e.g., at each residence).

Various boxes for telecommunications equipment are known. The boxes used for subscriber access points can have various forms depending on such factors as the environment, the space requirements for containing telecommunications equipment, and the type of technician access needed for the telecommunications equipment. These and other considerations are related to box design and usability.

Optical fiber splice closures (which are sometimes called splice cases or enclosures) generally include a casing which provides a closed space for containing splices between optical fibers. Such closures normally also contain excess lengths of the spliced optical fibers. These excess lengths of optical fibers are normally used to carry out the fiber splicing operation, which is generally performed using splicing equipment next to the closure. Excess fiber also may be used to facilitate organization the fiber splices in the closure. Optical fiber splice closures normally include one or more trays to store the splices in an organized manner. The excess optical fiber associated with the organized splices is stored in the closure in such a way that its bend radius does not fall below a minimum bend radius of the fiber (i.e., the minimum safe radius at which the fiber may be bent without causing damage to the fiber or causing signal loss in the fiber).

There is a continued need for improvement in closures such as splice closure designs or other enclosure designs.

SUMMARY

One aspect of the present disclosure relates to an enclosure having an elongate housing including a length that extends between opposite first and second ends. The elongate housing includes first and second housing parts that cooperate to enclose an interior of the housing. The first and second housing parts are movable relative to one another between an open position and a closed position. The enclosure includes a perimeter seal that provides sealing between the first and second housing parts when the first and second housing parts are in the closed position. The enclosure also includes a cable pass-through location provided at the second end of the elongate housing and a cable sealing arrangement at the cable pass-through location for sealing around cables routed through the cable pass-through location. The enclosure also includes a cable anchoring region located at the first housing part for anchoring cables routed through the cable pass-through location, a component mounting region located at the first housing part between the cable anchoring region and the first end of elongate housing, and at least one fiber optic adapter that mounts at the component mounting region. The fiber optic adapter includes a first connector port that faces at least partially toward the first end of the elongate housing and a second connector port that faces at least partially toward the second end of the elongate housing. The enclosure further includes a component holder that mounts at the component mounting region adjacent to the first fiber optic adapter, and a first fiber loop storage path defined at a first level within the first housing part. The first fiber loop storage path surrounds the component mounting region and includes first and second path length portions that extend along the length of the elongate housing respectively adjacent opposite first and second sides of the elongate housing. The first fiber loop storage path also includes first and second path width portions that extend across a width of the elongate housing between the first and second path length portions. The first path width portion is adjacent to the first end of the elongate housing and the second path width portion extends under a space dedicated for accommodating a fiber optic connector inserted into the second connector port of the fiber optic adapter. The enclosure also includes a cover that mounts to the first housing part for covering the first fiber loop storage path and the component mounting region. The cover is configured to block access to the first connector port of the fiber optic adapter when the cover is mounted to the first housing part. The cover includes a vaulted portion corresponding to the fiber optic adapter to provide clearance for accommodating a fiber optic connector inserted into the first connector port. The cover includes a second fiber loop storage path provided at a second level separated from the first level by the cover when the cover is mounted to the first housing part. The second fiber loop storage path includes first and second path length portions that generally overlay the first and second path length portions of the first fiber loop storage path when the cover is mounted to the first housing part. The second loop storage path also includes a first path width portion that generally overlays the first path width portion of the first fiber loop storage path when the cover is mounted to the first housing part.

Another aspect of the present disclosure relates to a telecommunication enclosure having first and second housing parts (e.g., pieces such as a base and a cover) that are movable relative to one another between an open position and a closed position. A gasket-type seal can be provided about a perimeter of the enclosure for sealing between the first and second housing parts. The enclosure can be elongate along a length that extends between opposite first and second ends of the enclosure. The first end can include a hinge for pivotally connecting the first and second housing parts together and for allowing the first and second housing parts to be pivoted relative to one another between an open position and a closed position. An interior of the enclosure is accessible when the enclosure is in the open position. The second end can include a staging latch arrangement that automatically snaps to a retaining position for temporarily holding the first and second housing parts in a closed position when the enclosure is pivoted closed. The staging latch arrangement functions to hold the enclosure closed until further securement can be implemented by actuating additional latches provided at elongate sides of the enclosure for providing further closing retention force. In certain examples, a cable pass-through can be provided at the second end. The cable pass-though can include a cable sealing arrangement for sealing around cables that enter/exit the enclosure. The cable sealing arrangement can include one or more volumes (e.g., blocks) of sealing material such as sealing gel (e.g., silicone gels and thermoplastic elastomeric gels). The sealing gel can be contained within a gel containment chamber defined by the housing parts at the second end.

Another aspect of the present disclosure relates to a telecommunication enclosure having first and second housing parts (e.g., pieces such as a base and a cover) that are movable relative to one another between an open position and a closed position. A gasket-type seal can be provided about a perimeter of the enclosure for sealing between the first and second housing parts. The enclosure can be elongate along a length that extends between opposite first and second ends of the enclosure. In certain examples, a cable pass-through can be provided at one of the ends. The cable pass-though can include a cable sealing arrangement for sealing around cables that enter/exit the enclosure. The cable sealing arrangement can include one or more volumes (e.g., blocks) of sealing material such as sealing gel (e.g., silicone gels and thermoplastic elastomeric gels). The sealing gel can be contained within a gel containment chamber defined by the housing parts at the second end. The gel can be arranged incorporated in modules having frames that support the gel and leaf springs for applying pressure to the gel upon sealing. In one example, a primary portion of the gel containment chamber can be defined by the first housing part, the perimeter gasket can be held within a perimeter channel defined by the first housing part, and the first housing part can include a snap-fit feature unitary with a wall of the first housing part. The snap-fit feature is preferably positioned deeper within the first housing part than the perimeter gasket and is adapted for engaging the frame or leaf spring of a corresponding one of the gel sealing modules to secure the gel sealing module within the primary portion of the gel containment chamber. In a preferred example, the snap-fit structure is directly adjacent to a floor or base of the first housing part and engages a base frame portion or the leaf spring of the gel sealing module. The base frame portion or leaf spring can be positioned at a side of the gel sealing module opposite from a cable sealing/contacting side of the gel sealing module. The entire gel sealing module is preferably flexed along its length to engage and interlock with the snap-fit features. The gel sealing module can flex into a spring expansion chamber beneath the gel containment chamber during flexing of the module to engage the module with the snap-fit structures. The snap-fit structures can be ramped and can include retention surfaces. Most or all of the elastic flexing that occurs during interlocking of the gel sealing module with the snap-fit structure is provided by the gel sealing module.

A further aspect of the present disclosure relates to a telecommunication enclosure having first and second housing parts (e.g., pieces such as a base and a cover) that are movable relative to one another between an open position and a closed position. A gasket-type seal can be provided about a perimeter of the enclosure for sealing between the first and second housing parts. The enclosure can include first and second opposite ends. In certain examples, a cable pass-through can be provided at one of the ends. The cable pass-though can include a cable sealing arrangement for sealing around cables that enter/exit the enclosure through the end of the enclosure. The cable sealing arrangement can include one or more volumes (e.g., blocks) of sealing material such as sealing gel (e.g., silicone gels and thermoplastic elastomeric gels). The sealing gel can be contained within a gel containment chamber defined by the housing parts at the second end. In one example, a primary portion of the gel containment chamber can be defined between inner and outer gel containment walls of the first housing part. The inner and outer gel containment walls can define cable pass-through openings such as cable pass-through notches. The second housing part can be configured to reinforce and stabilize the inner and outer gel containment walls when the enclosure is closed. For example, the second housing part can include an outer flange adapted to overlap an outer side of the outer gel containment wall when the enclosure is closed, and the second housing part can include an inner flange adapted to overlap an inner side of the inner gel containment wall when the enclosure is closed. In this way, the inner and outer gel containment walls as well as the cable sealant contained between the inner and outer gel containment walls are captured between the inner and outer flanges of the second housing part when the enclosure is closed. In one example, the first housing part includes reinforcing walls (e.g., ribs) integrally formed with the inner side of the inner gel containment wall and perpendicularly oriented with respect to the inner gel containment wall. The reinforcing walls can include notches for receiving the inner flange of the second housing part when the enclosure is closed.

A further aspect of the present disclosure relates to a telecommunication enclosure having first and second housing parts (e.g., pieces such as a base and a cover) that are movable relative to one another between an open position and a closed position. A gasket-type seal can be provided about a perimeter of the enclosure for sealing between the first and second housing parts. The enclosure can include first and second opposite ends. In certain examples, a cable pass-through can be provided at one of the ends. The cable pass-though can include a cable sealing arrangement for sealing around cables that enter/exit the enclosure through the end of the enclosure. The cable sealing arrangement can include one or more volumes (e.g., blocks) of sealing material such as sealing gel (e.g., silicone gels and thermoplastic elastomeric gels). The sealing gel can be contained within a gel containment chamber defined by the housing parts at the second end. In one example, a primary portion of the gel containment chamber can be defined between inner and outer gel containment walls of the first housing part. The inner and outer gel containment walls can define cable pass-through openings such as cable pass-through notches. The first housing part can include a cable anchoring region positioned adjacent an inner side of the inner gel containment wall. Cable anchoring modules can be secured to the first housing part at the cable anchoring region in alignment with the cable pass-through locations for use in anchoring cables routed through the cable sealing arrangement to the first housing part. The cable anchoring region can include a grid of openings for use in attaching the cable anchoring modules to the cable anchoring region (e.g., via snap-fit connections, slide interlocks, or other mechanical connections). The grid of openings can be defined by a cable anchoring plate secured to the first housing part. In one example, the cable anchoring plate is optionally secured to the first housing part by a snap-fit connection. In certain examples, the cable anchoring modules each include a first attachment location that attaches to (e.g., interlocks with) the cable anchoring plate and a second attachment location that attaches to (e.g., interlocks with) the inner gel containment wall. In one example, the second attachment location inhibits movement of the cable anchoring module in an axial orientation (e.g., a cable pass-through orientation) and the first attachment location inhibits movement of the cable anchoring module in an orientation perpendicular with respect to the axial orientation.

Another aspect of the present disclosure relates to a telecommunication enclosure having first and second housing parts (e.g., pieces such as a base and a cover) that are movable relative to one another between an open position and a closed position. A gasket-type seal can be provided about a perimeter of the enclosure for sealing between the first and second housing parts. The enclosure can be elongate along a length that extends between opposite first and second ends of the enclosure. In certain examples, a cable pass-through can be provided at the second end. The cable pass-though can include a cable sealing arrangement for sealing around cables that enter/exit the enclosure. The cable sealing arrangement can include one or more volumes (e.g., blocks) of sealing material such as sealing gel (e.g., silicone gels and thermoplastic elastomeric gels). The sealing gel can be contained within a gel containment chamber defined by the housing parts at the second end. The first housing part can include a cable anchoring region positioned adjacent the cable sealing arrangement for anchoring cables that pass through the cable sealing arrangement to the enclosure. Cable anchoring modules can be secured to the first housing part at the cable anchoring region in alignment with the cable pass-through locations for use in anchoring cables that pass through the cable sealing arrangement to the first housing part. The cable anchoring region can include a grid of openings for use in attaching the cable anchoring modules to the cable anchoring region (e.g., via snap-fit connections, slide interlocks, or other mechanical connections). The grid of openings can be defined by a cable anchoring plate secured to the first housing part. In one example, the cable anchoring plate is optionally secured to the first housing part by a snap-fit connection. The first housing part also can include a component mounting region for mounting optical components such as optical splices, passive optical power slitters, optical tap devices and wavelength division multiplexers. In one example, the component mounting region is positioned between the cable anchoring region and the first end of the enclosure. In one example, the component mounting region can include a grid of openings for use in attaching the component mounting modules (e.g., component holders such as splice holders, splitter holders, etc.) to the component mounting region (e.g., via snap-fit connections, slide interlocks, or other mechanical connections). The grid of openings can be defined by a component mounting plate secured to the first housing part. In one example, the component mounting plate is optionally secured to the first housing part by a snap-fit connection. The enclosure also includes a fiber optic adapter module that extends across a boundary between the cable anchoring region and the component mounting region. The fiber optic adapter module includes a module frame that extends axially across the boundary between the cable anchoring region and the component mounting location such that a first portion of the module frame extends over the cable anchoring region and a second portion of the module frame extends over the component mounting location. The module frame can include an interlock arrangement that connects (e.g., snap-fits with, slide-interlocks with, etc.) with the grid of the cable anchoring location, or the grid of the component mounting location or the grids of both the cable anchoring location and the component mounting location. The fiber optic adapter module also includes at least one fiber optic adapter connected to the module frame. In one example, the fiber optic adapter is pivotally moveable relative to the module frame. The fiber optic adapter can define opposite adapter ports for receiving fiber optic connectors desired to be de-mateably optically connected together. The fiber optic adapter can include a ferrule alignment sleeve for aligning the ferrules of the fiber optic connectors inserted within the adapter ports. The fiber optic adapter can be positioned such a central adapter axis extending axially through the adapter ports is parallel to the longitudinal axis of the enclosure. In certain examples, more than one fiber optic adapter can be mounted on the adapter frame. In one example, two fiber optic adapters can be mounted on the module frame. In one example, the adapters can be SC fiber optic adapters configured to receive SC fiber optic connectors. In one example, the adapters can be LC adapters configured to receive LC fiber optic connectors. In one example, the adapters include two sets of duplex LC adapters. In one example, a fiber storage loop path is defined around the component mounting region. The fiber storage loop path can be adapted to store excess fiber associated with optical fibers optically spliced together at splice locations held at the component mounting region. The optical splices can include splices between the optical fibers of two fiber optic cables routed into the enclosure, or optical splices between optical fibers of optical cables routed into the enclosure and optical fibers of connectorized pigtails. In certain examples, the fiber storage loop path can extend over, under or through the fiber optic adapter module. For example, the module frame can define a fiber channel that extends across a width of the adapter frame at a location beneath a dedicated space corresponding to where a connector plugged into one of the adapter ports would be located. In one example, the channel can extend across a width of the cable anchoring region. In another example, a fiber channel can be defined by a fiber guide such that the fiber channel extends across a width of the adapter frame at a location over the module frame and above a dedicated space corresponding to where a connector plugged into one of the adapter ports would be located. In one example, the fiber guide extends over the cable anchoring region and is pivotally moveable relative to the first housing part to facilitate accessing the adapter port of the fiber optic adapter.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 9 is a front plan view of a cable sealing arrangement of the enclosure of FIG. 1;

FIG. 10 is a cross-sectional view taken along section line 10-10 of FIG. 9;

FIG. 27 is a perspective view of a component mounting assembly of the enclosure of FIGS. 22-26;

FIG. 28 is another perspective view of the component mounting assembly of FIG. 27;

FIG. 37 is a perspective view a cable anchor suitable for being secured to anchor mounting plates of the type incorporated into enclosures in accordance with the principles of the present disclosure;

FIG. 38 is an enlarged view of a portion of FIG. 36;

FIG. 39 is another perspective view of the cable anchor of FIG. 37;

FIG. 40 is an enlarged view of a portion of FIG. 39;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 2:
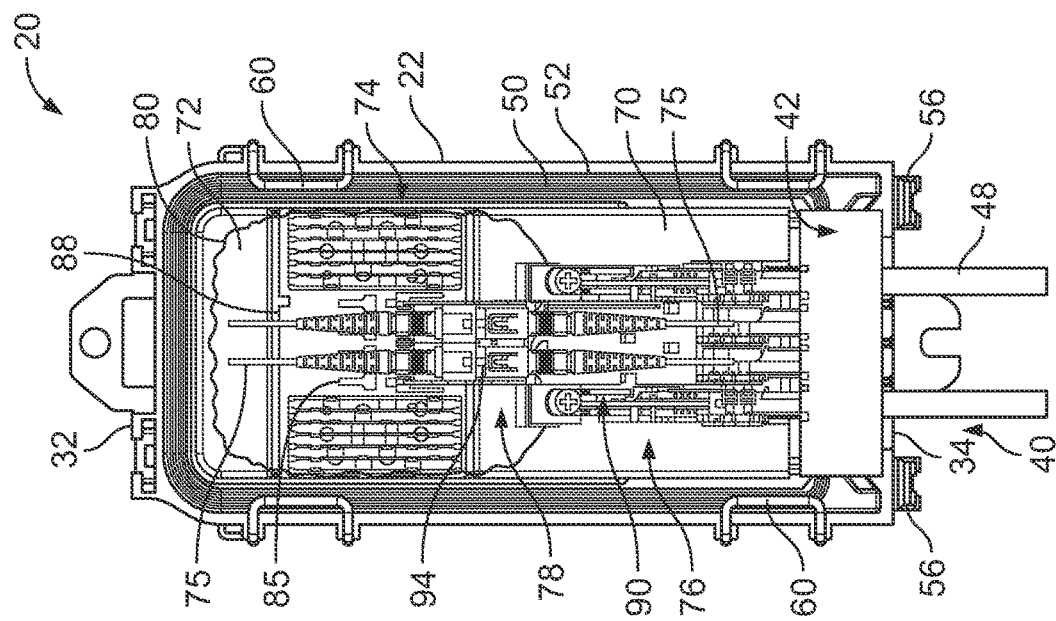
FIG. 2 is a front plan view of the telecommunication enclosure of FIG. 1 with a front cover removed.
Figure 1:
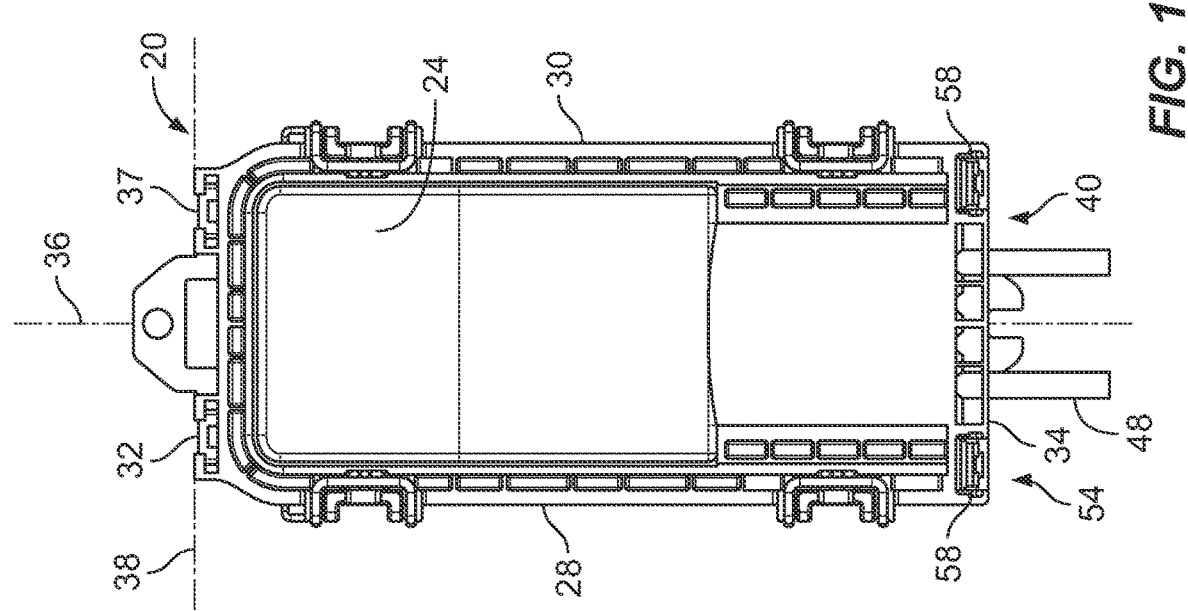
FIG. 1 is a front plan view of a telecommunication enclosure in accordance with the principles of the present disclosure, the enclosure is shown in a closed position.

FIGS. 1 and 2 depict a telecommunication enclosure 20 in accordance with the principles of the present disclosure. The telecommunication enclosure 20 includes a first housing part such as base 22 and a second housing part such as a cover 24 that cooperate to enclose an interior of the telecommunication enclosure 20. The telecommunication enclosure 20 is preferably an environmentally sealed enclosure adapted for outside environmental use. It will be appreciated that the cover 24 is moveable with respect to the base 22 to provide access to an interior of the telecommunication enclosure 20. The telecommunication enclosure 20 includes opposite sides 28, 30 that extend between opposite first and second ends 32, 34 of the telecommunication enclosure 20. In the depicted example, the telecommunication enclosure 20 has an elongate configuration along a longitudinal axis 36 of the telecommunication enclosure 20. Thus, the sides 28, 30 are longer than the ends 32, 34. A width of the telecommunication enclosure 20 extends between the sides 28, 30 and a length of the enclosure 20 extends between the ends 32, 34.

Figure 3:
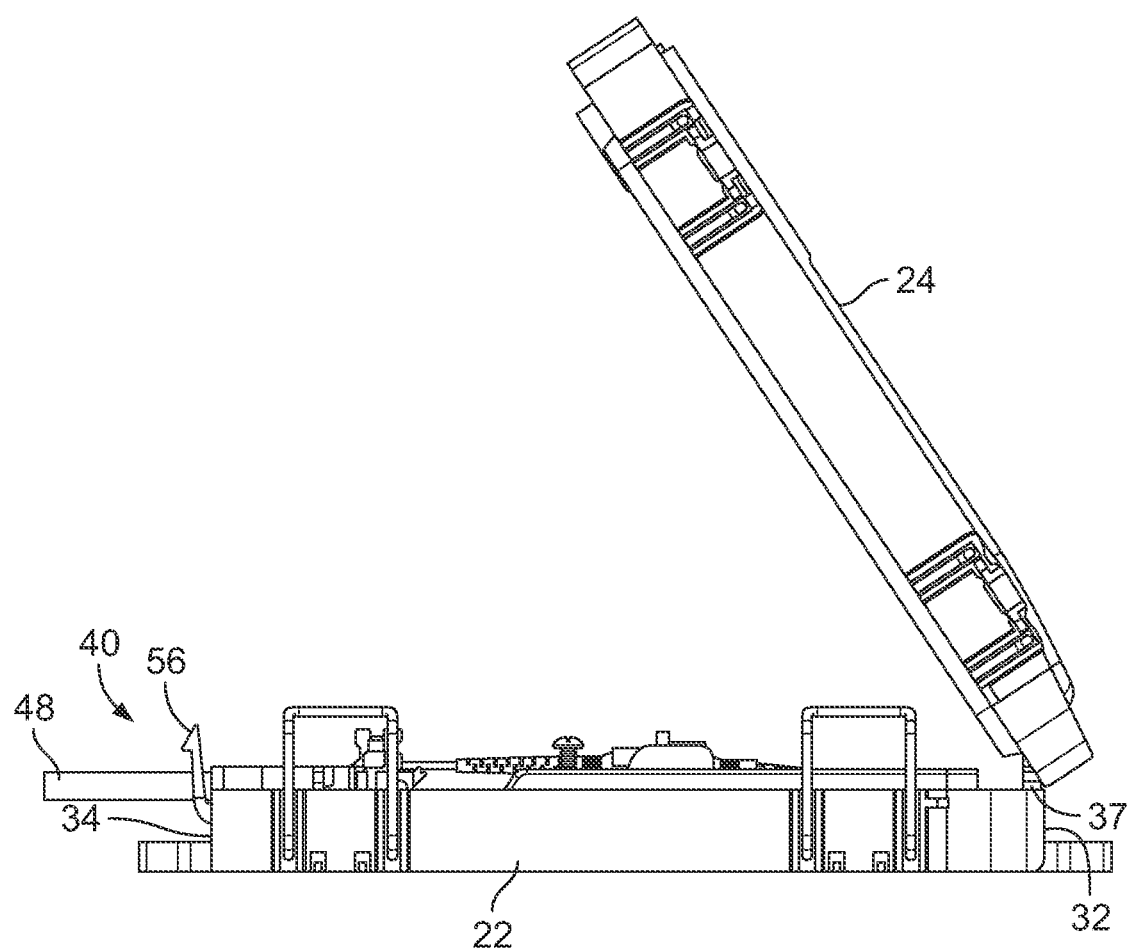
FIG. 3 is a side view of the telecommunication enclosure of FIG. 1 with the enclosure pivoted to an open position.
Figure 14:
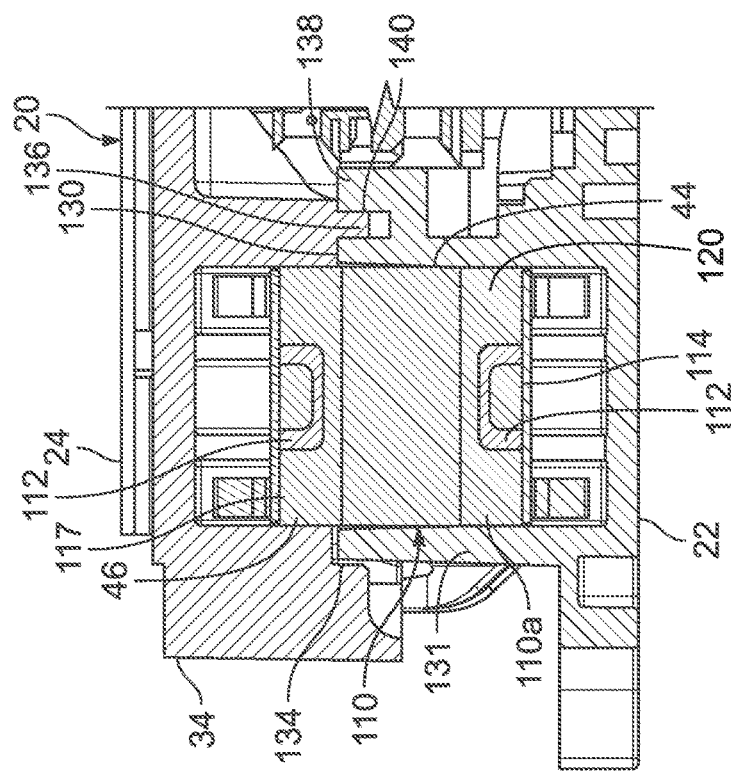
FIG. 14 is a cross-sectional view showing inner and outer gel containment walls of the base of the enclosure of FIG. 1 being reinforced by inner and outer flanges of the cover of the enclosure of FIG. 1.
Figure 13:
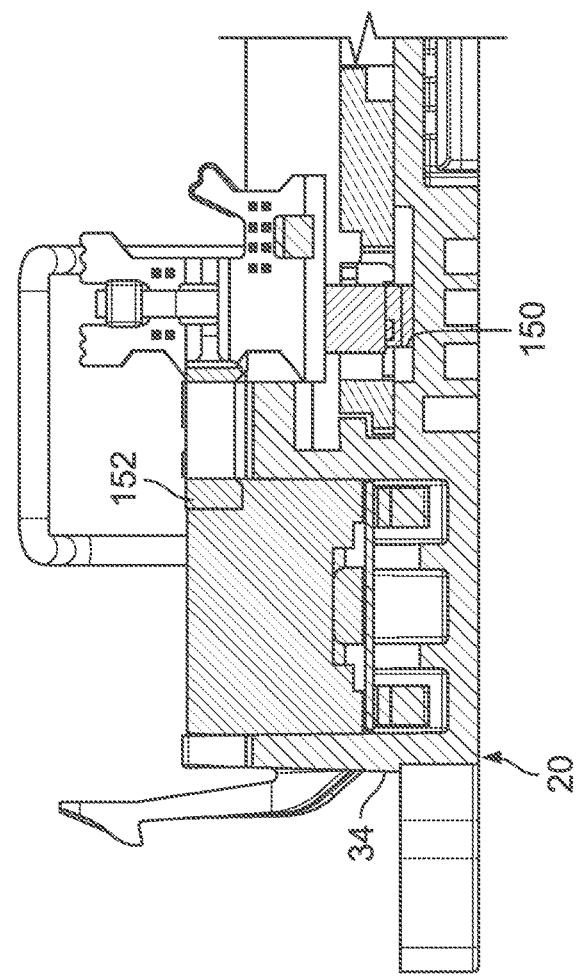
FIG. 13 is a cross-sectional view showing a cable anchoring module interlocked with an inner gel containment wall of a base of the enclosure of FIG. 1.

The base 22 and the cover 24 are movable relative to one another between an open position (see FIG. 3) and a closed position (see FIG. 1). A hinge 37 is provided at the first end 32 of the telecommunication enclosure 20 for allowing the base 22 and the cover 24 to be pivoted between the closed and open positions. The hinge 37 defines a pivot axis 38 about which the base 22 and the cover 24 pivot relative to one another. A cable pass-through location 40 is provided at the second end 34 of the telecommunication enclosure 20. The cable pass-through location 40 as well as the second end 34 of the telecommunication enclosure 20 are sealed by a cable sealing arrangement 42. As shown at FIG. 14, the cable sealing arrangement 42 includes a first sealing block 44 mounted to the base 22 and a second sealing block 46 mounted to the cover 24. It will be appreciated that the first and second sealing blocks 44, 46 can be constructed of a sealing material such as rubber, gel or the like. A cable sealing interface, which cables 48 such as fiber optic cables can be routed through into the telecommunication enclosure 20 extend is defined between the first and second sealing blocks 44, 46. When the housing of the telecommunication enclosure 20 is closed, the first and second sealing blocks 44, 46 deform about the cables 48 to provide sealing about the cables 48. Positioning of the cable sealing arrangement 42 at the second end 34 opposite from the hinge 37 allows the blocks of sealant to meet at a larger radius about the pivot axis 38 as compared to if the blocks were positioned at the hinge 37 to assist in reducing sealant shearing and facilitating sealant containment.

It will be appreciated that a perimeter of the housing of the telecommunication enclosure 20 is also preferably sealed when the housing is in the closed position. To provide perimeter sealing, a perimeter seal 50 such as an elastomeric gasket can be mounted between the base 22 and the cover 24 to provide perimeter sealing when the base 22 and the cover 24 are moved to the closed position. In certain examples, perimeter seal 50 can fit within a perimeter channel 52 defined by the base 22 and can be engaged by a sealing rib defined by the cover 24. In the depicted example, the perimeter seal 50 coincides with a perimeter path that extends along opposite first and second sides 28, 30 of the housing and also extends around the first end 32 of the housing. The perimeter seal 50 also preferably contacts the cable sealing arrangement 42 at the second end 34 of the housing to provide seal continuity.

Figure 5:
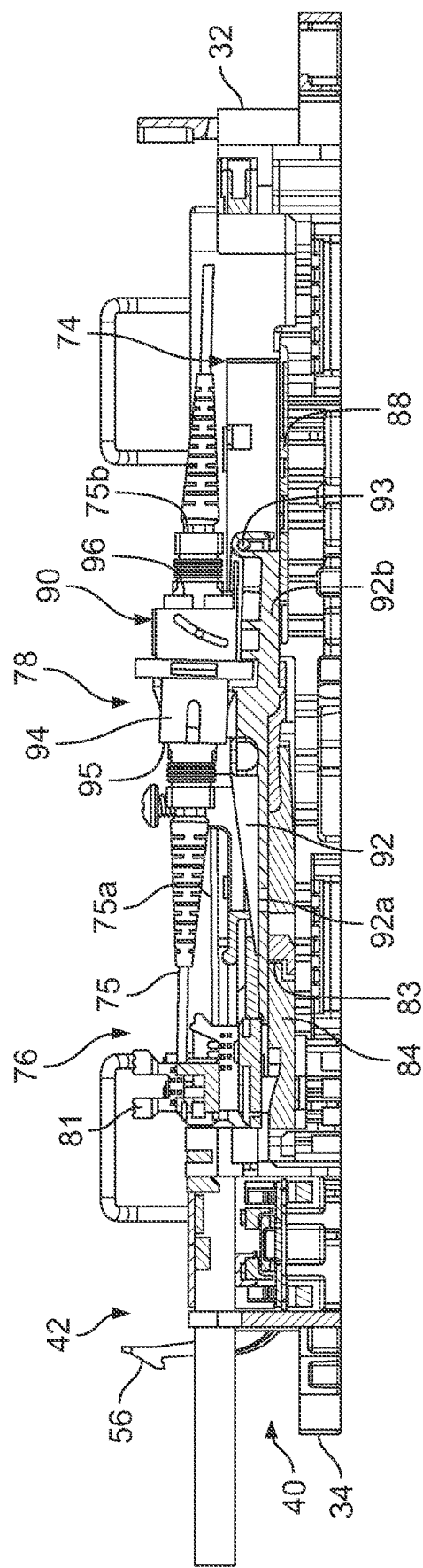
FIG. 5 is a longitudinal cross-sectional view of the enclosure of FIG. 1 with the front cover removed.

Referring to FIG. 5, the housing includes a pre-latch 54 at the second end 34 of the housing for automatically securing the base 22 and the cover 24 in the closed position when the base 22 and the cover 24 are pivoted to the closed position. The pre-latch 54 includes a pair of latch members 56 unitarily formed with the base 22 and a pair of latch receivers 58 unitarily formed with the cover 24. The telecommunication enclosure 20 further includes primary latches 60 positioned along the first and second sides 28, 30 of the housing for latching the housing in the closed position. In certain examples, the primary latches 60 can each include a spring clip or other resilient structure for holding the housing in the closed position and for applying sealing pressure on the perimeter seal 50 such that seal integrity is maintained over time. The spring clips can include lever arms/cams that are actuated to close the latches and flex the springs.

Referring to FIG. 2, telecommunication enclosure 20 is depicted as a splice enclosure with connectorized patching functionality. In the depicted example, the telecommunication enclosure 20 is a butt-style closure in which fiber optic cables can only enter and exit the telecommunication enclosure 20 through the second end 34 of the housing. In the depicted example, the fiber optic cables can enter and enter the telecommunication enclosure 20 through the second end 34 of the telecommunication enclosure 20. In other examples, cable pass-through locations may be provided at both ends of the enclosure.

Figure 4:
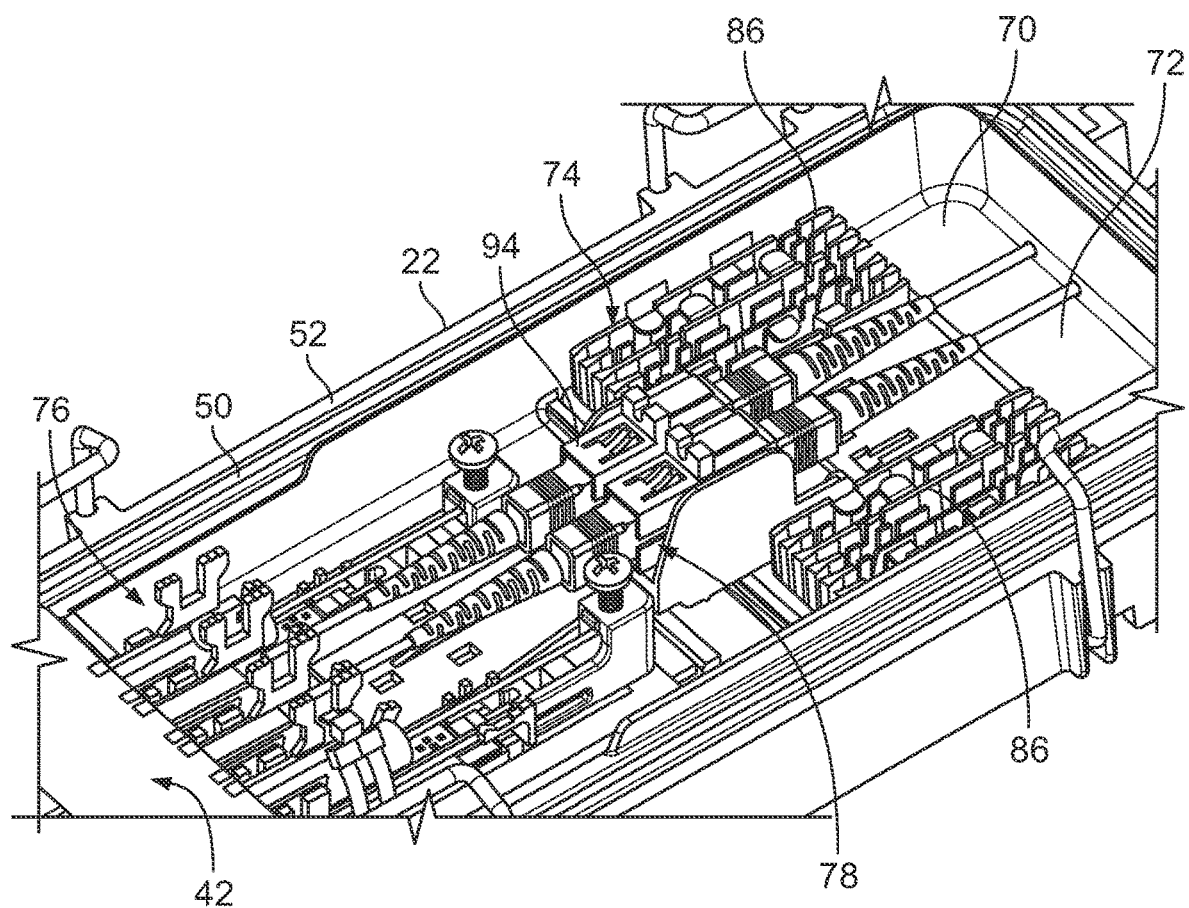
FIG. 4 is a perspective view showing an interior of the enclosure of FIG. 1.

Referring still to FIGS. 2 and 4, the base 22 defines a main compartment 70. The main compartment 70 is positioned above a main base surface 72 and forms a floor-like structure of the base 22. Various components can be mounted to the main base surface 72. As depicted, within the main compartment 70, the base 22 defines a fiber optic component mounting region 74, a cable anchoring region 76 and a connectorized patching region 78. The cable anchoring region 76 is positioned adjacent the second end 34 where the cables enter and exit the telecommunication enclosure 20. The cable anchoring region 76 can include a plurality of cable anchors for securing (e.g., fixing, locking, attaching) the fiber optic cables routed into the enclosure through the cable sealing arrangement 42 to the base 22. Cable anchors can include clamps, cable tie locations, cable fasteners, strength member fasteners such as bolts, blades for engaging and retaining the cables, and other structures. The fiber optic component mounting region 74 is located between the cable anchoring region 76 and the first end 32 of the housing. The fiber optic component mounting region 74 provides a location where optical components such as optical fusion splices, passive optical power splitters, wavelength division multi-plexers and passive optical taps can be mounted.

The base 22 can also define a fiber routing path 80 that surrounds the fiber optic component mounting region 74. It will be appreciated that to perform a fusion splice, a significant length of optical fiber is required to be compatible with existing fusion splicing machines. The fiber routing path 80 surrounding the fiber optic component mounting region 74 provides a region where such fiber length can be stored without violating minimum bend requirements. The stored/looped fiber lengths can correspond to optical fibers of different cables routed into the enclosure that are spliced together at optical splices stored at the fiber optic component mounting region 74. The stored/looped fiber lengths can also correspond to optical fibers spliced together at a splice location at the fiber optic component mounting region 74 which corresponding to the fibers of cables routed into the enclosure and the fibers of connectorized pigtails 75 spliced to the cable fibers with the connectorized ends plugged into ports of the connectorized patching region 78. The fiber routing path 80 can also store lengths of uncut optical fiber passed through the enclosure 20 from two different sections of fiber optic cable sealed at the second end 34.

Cable anchoring modules 81 can be secured to the base 22 at the cable anchoring region 76 in alignment with the cable pass-through locations through the cable sealing arrangement 42. The cable anchoring modules 81 can be used for anchoring the cables 48 that pass through the cable sealing arrangement 42 into the interior of the telecommunication enclosure 20 to the base 22. The cable anchoring region 76 can include a grid of openings 83 for use in attaching the cable anchoring modules 81 to the cable anchoring region 76 (e.g., via snap-fit connections, slide interlocks, or other mechanical connections). The grid of openings 83 can be defined by a cable anchoring plate 84 secured to the base 22. In one example, the cable anchoring plate 84 is optionally secured to the base 22 by a snap-fit connection. For example, the cable anchoring plate 84 can be snapped within a recess defined by the base 22.

In one example, the fiber optic component mounting region 74 can include a grid of openings 85 for use in attaching the component mounting modules 86 (e.g., component holders such as splice holders, splitter holders, etc.) to the fiber optic component mounting region 74 (e.g., via snap-fit connections, slide interlocks, or other mechanical connections). The grid of openings 85 can be defined by a component mounting plate 88 secured to the base 22. In one example, the component mounting plate 88 is optionally secured to the base 22 by a snap-fit connection. For example, the component mounting plate 88 can be snapped within a recess defined by the base 22. The component mounting modules 86 can includes slots for holding optical splices or other optical components such as splice protectors. A typical splice between two optical fibers is protected by a splice protector that may include a heat shrink element, a reinforcing rod and an adhesive material.

Figure 8:
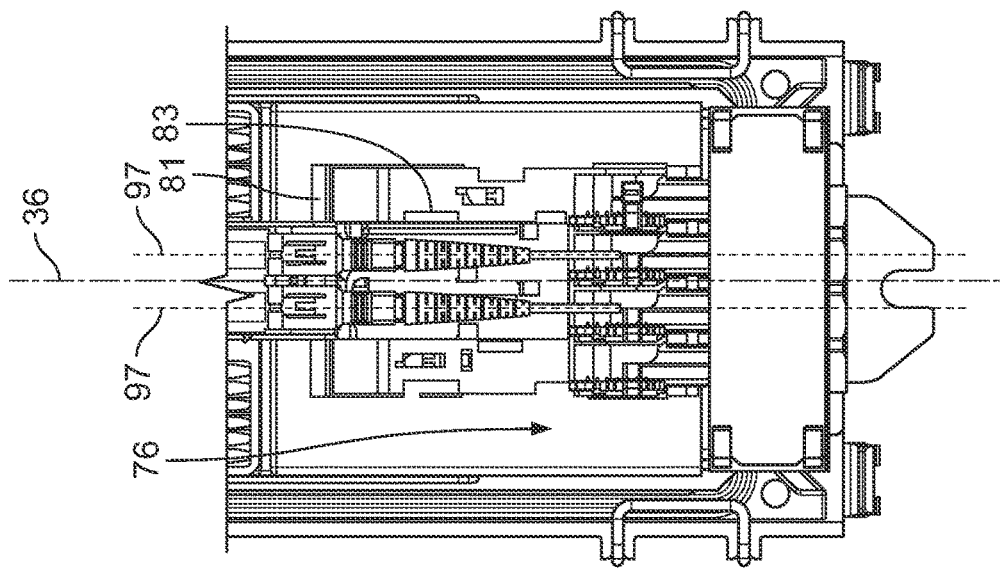
FIG. 8 is a plan view of a cable anchoring region of the enclosure of FIG. 1 with an adapter module mounted at a center position of the cable anchoring region.
Figure 7:
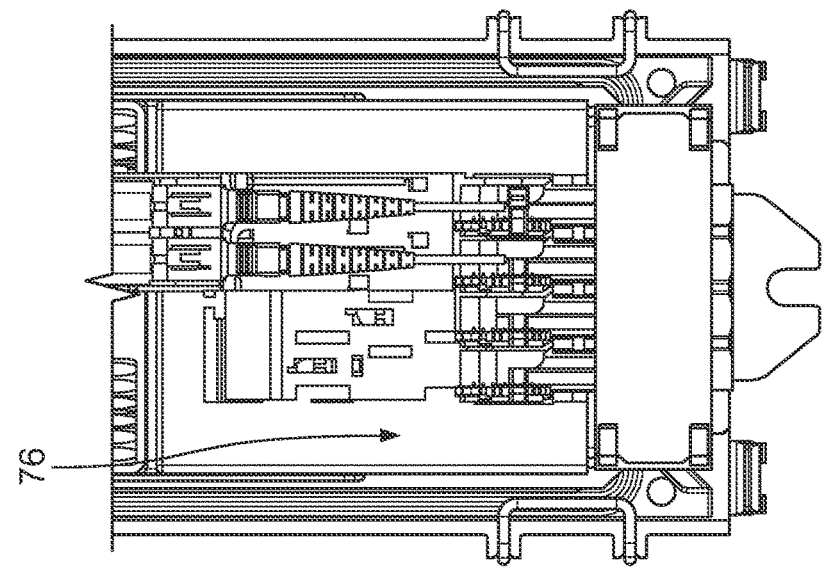
FIG. 7 is a plan view of a cable anchoring region of the enclosure of FIG. 1 with an adapter module mounted at a right position of the cable anchoring region.
Figure 6:
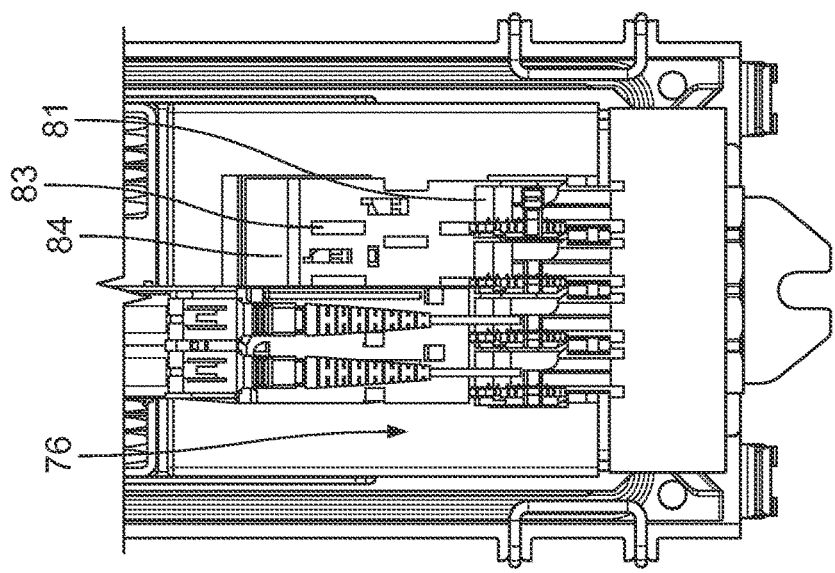
FIG. 6 is a plan view of a cable anchoring region of the enclosure of FIG. 1 with an adapter module mounted at a left position of the cable anchoring region.
Figure 12:
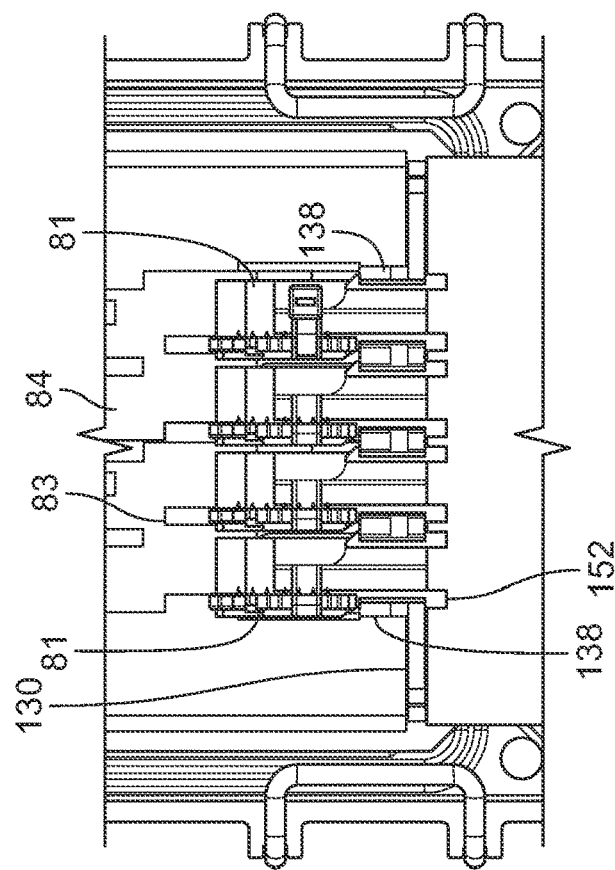
FIG. 12 is a front plan view of the cable anchoring region of the enclosure of FIG. 1.
Figure 11:
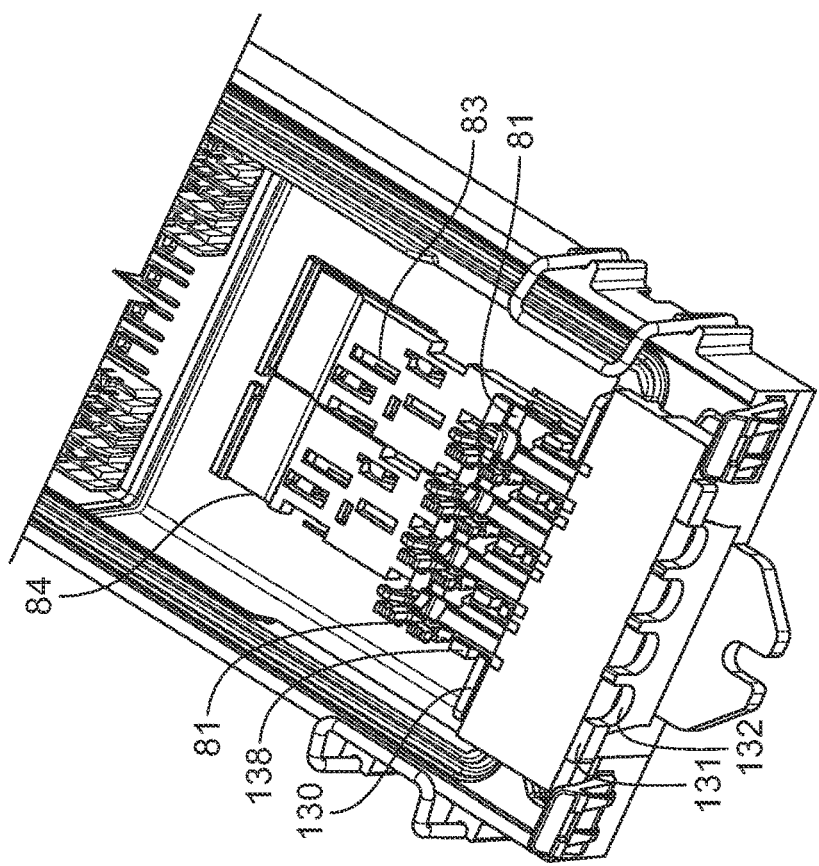
FIG. 11 is a perspective view of the cable anchoring region of the enclosure of FIG. 1.

The connectorized patching region 78 includes a fiber optic adapter module 90 that extends across a boundary between the cable anchoring region 76 and the fiber optic component mounting region 74. The fiber optic adapter module 90 includes a module frame 92 that extends axially across the boundary between the cable anchoring region 76 and the fiber optic component mounting region 74 such that a first portion 92a of the module frame 92 extends over the cable anchoring region 76 and a second portion 92b of the module frame 92 extends over the fiber optic component mounting region 74. The module frame 92 can include an interlock arrangement that connects (e.g., snap-fits with, slide-interlocks with, etc.) with the grid of openings 83 of the cable anchoring region 76, or the grid of openings 85 of the fiber optic component mounting region 74 or the grid of openings 83, 85 of both the cable anchoring region 76 and the fiber optic component mounting region 74. As shown at FIG. 6-8, the fiber optic adapter module 90 can be mounted to the cable anchoring region at a left position, a right position and a center position.

The fiber optic adapter module 90 also includes at least one fiber optic adapter 94 connected to the module frame 92 (two fiber optic adapters are shown). The fiber optic adapter 94 can be configured for providing a de-mateable optical connection between a first connectorized pigtail 75a connected (e.g., spliced) to an optical fiber of a first cable routed into the enclosure and a second connectorized pigtail 75b connected (e.g., spliced) to an optical fiber of another cable routed into the enclosure.

In one example, the fiber optic adapters 94 are pivotally moveable relative to the module frame 92. For example, the fiber optic adapters 94 can pivot about a pivot axis 93 relative to the module frame 92 to facilitate accessing the fiber optic adapters 94. The fiber optic adapters 94 can each define opposite adapter ports 95, 96 for receiving fiber optic connectors desired to be de-mateably optically connected together (e.g., the ends of the connectorized pigtails 75a, 75b). The fiber optic adapters 94 can each include a ferrule alignment sleeve for aligning the ferrules of the fiber optic connectors inserted within the adapter ports 95, 96. The fiber optic adapters 94 can be positioned such a central adapter axes 97 extending axially through the adapter ports 95, 96 are parallel to the longitudinal axis 36 of the telecommunication enclosure 20. In certain examples, more than one fiber optic adapter can be mounted on the module frame 92. In one example, two fiber optic adapters 94 can be mounted on the module frame 92. In one example, the adapters can be SC fiber optic adapters configured to receive SC fiber optic connectors. In one example, the adapters can be LC adapters configured to receive LC fiber optic connectors. In one example, the adapters include two sets of duplex LC adapters.

Figure 15:
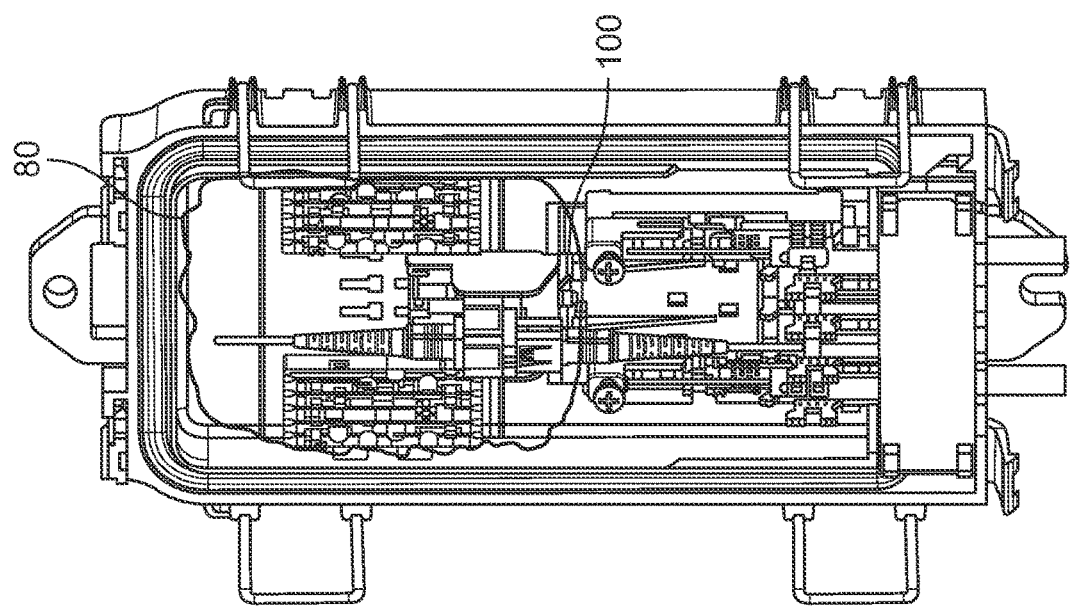
FIG. 15 is another view depicting the interior region of the base of the enclosure of FIG. 1, a pair of fiber optic connectors has been removed from the adapter module to reveal an underlying fiber passage channel defined by a module frame of the adapter module.
Figure 17:
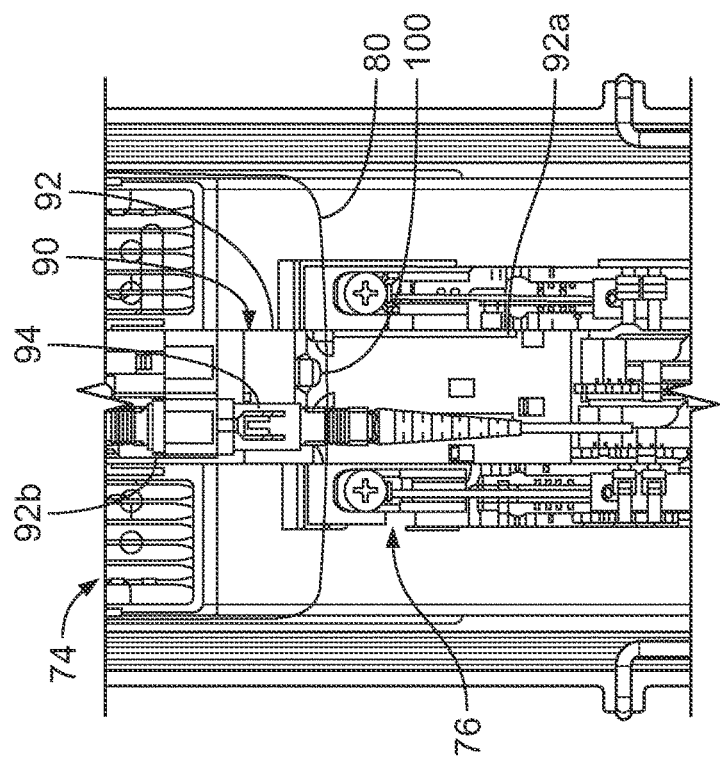
FIG. 17 is an enlarged view of a portion of FIG. 16.
Figure 16:
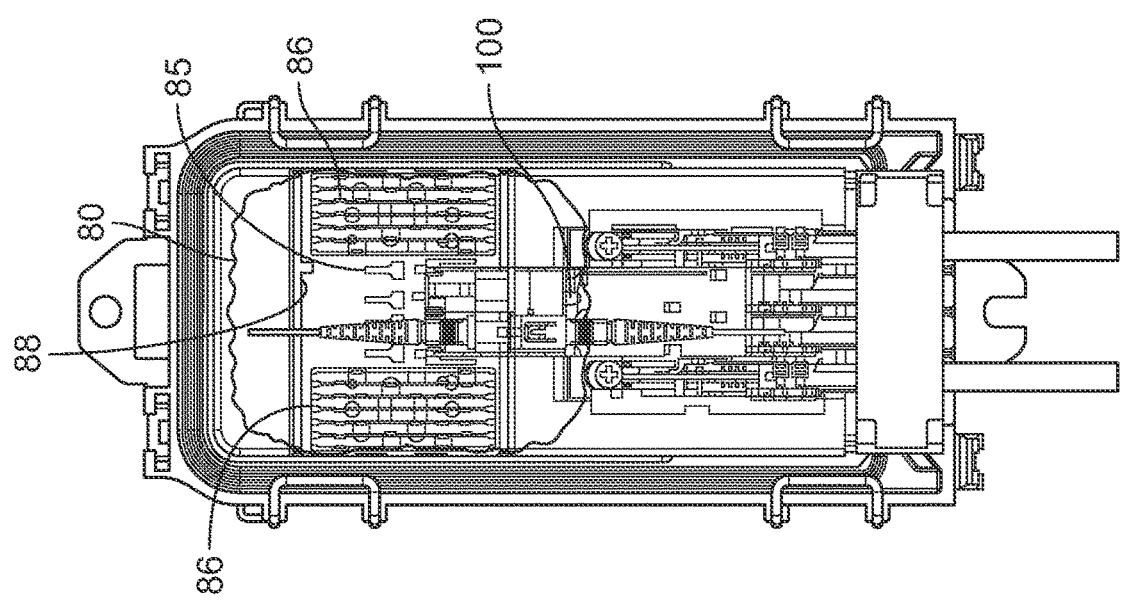
FIG. 16 is a front plan view showing the adapter module of FIG. 15.
Figure 18:
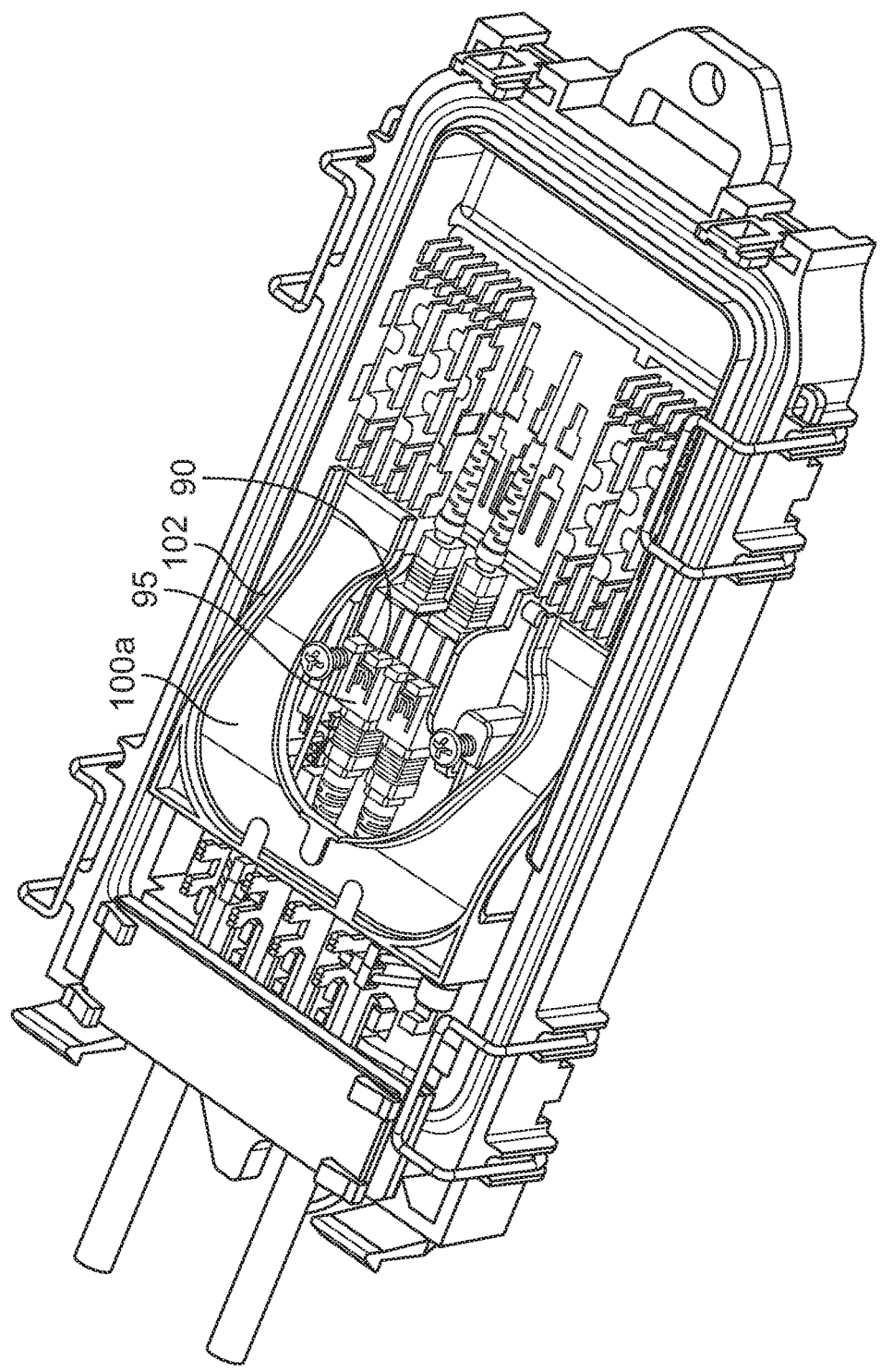
FIG. 18 is a perspective view of showing an alternative fiber routing loop including a fiber guide that extends over the fiber optic adapter module.
Figure 19:
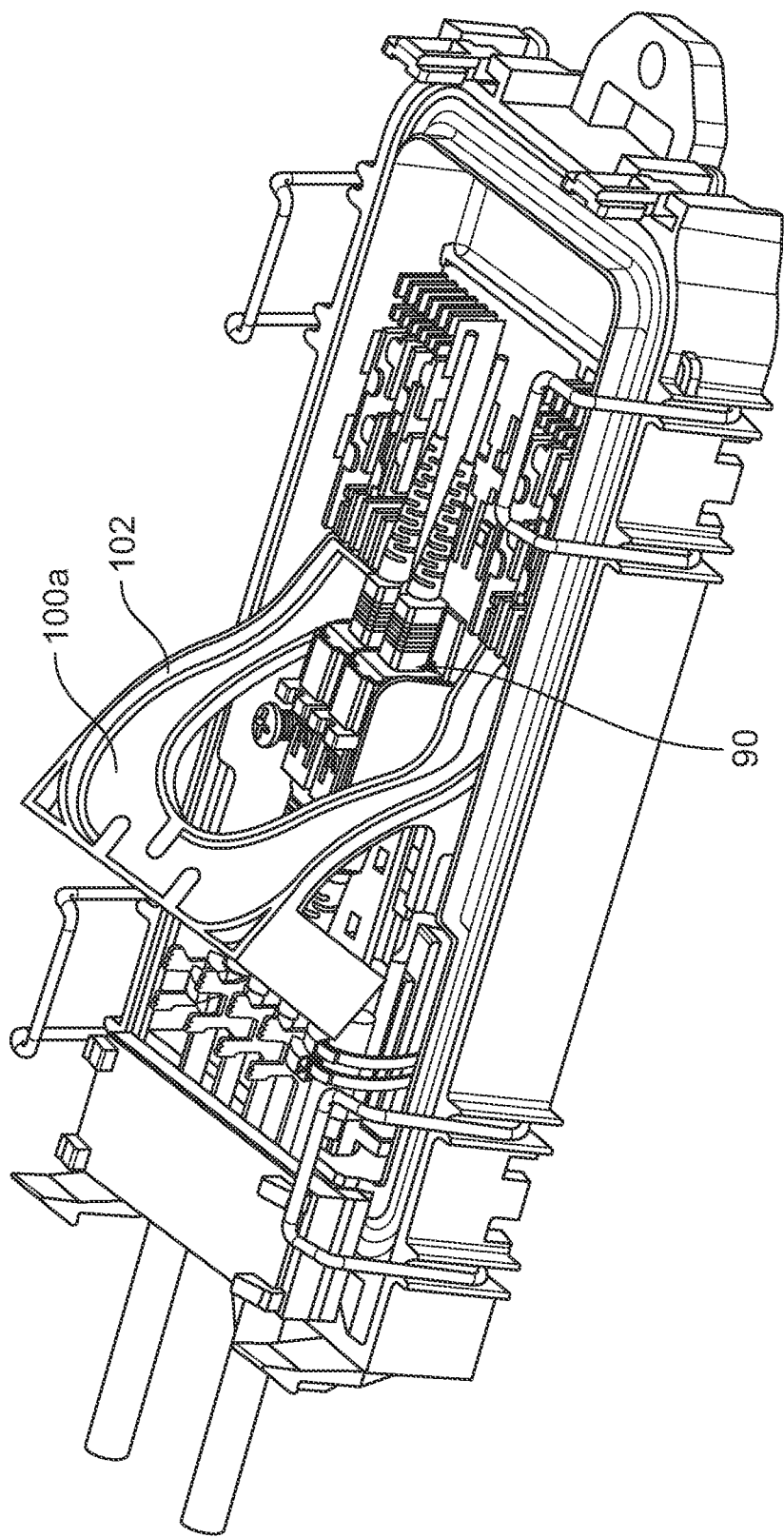
FIG. 19 shows the fiber guide of FIG. 18 pivoted to a position where the underlying fiber optic adapters are more accessible.
Figure 20:
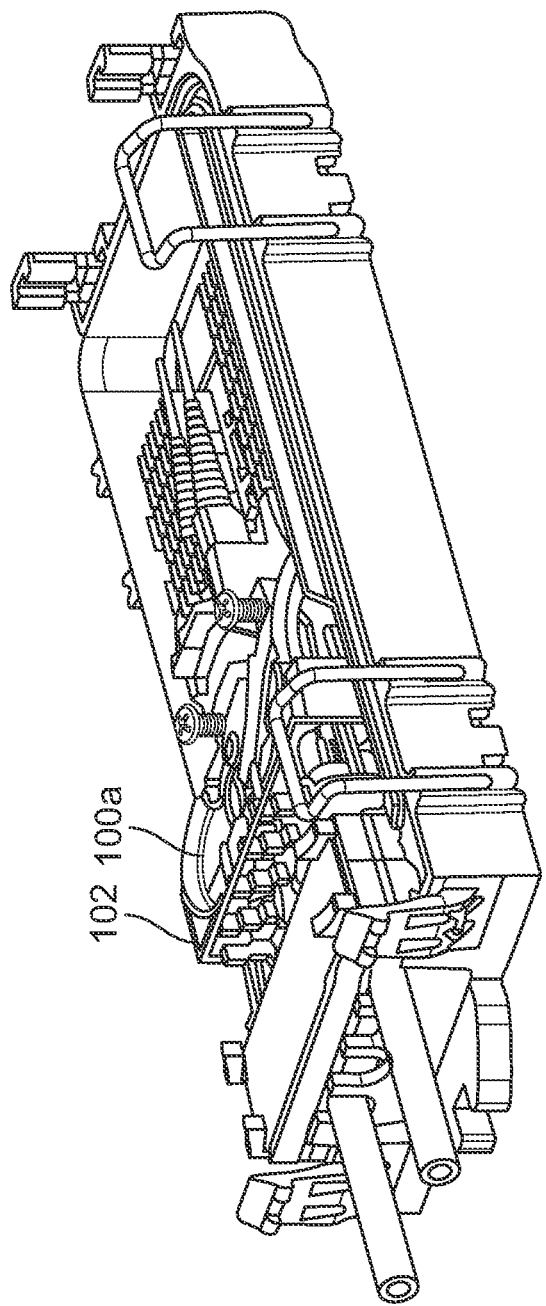
FIG. 20 is another perspective view showing the fiber guide mounted to the enclosure.
Figure 21:
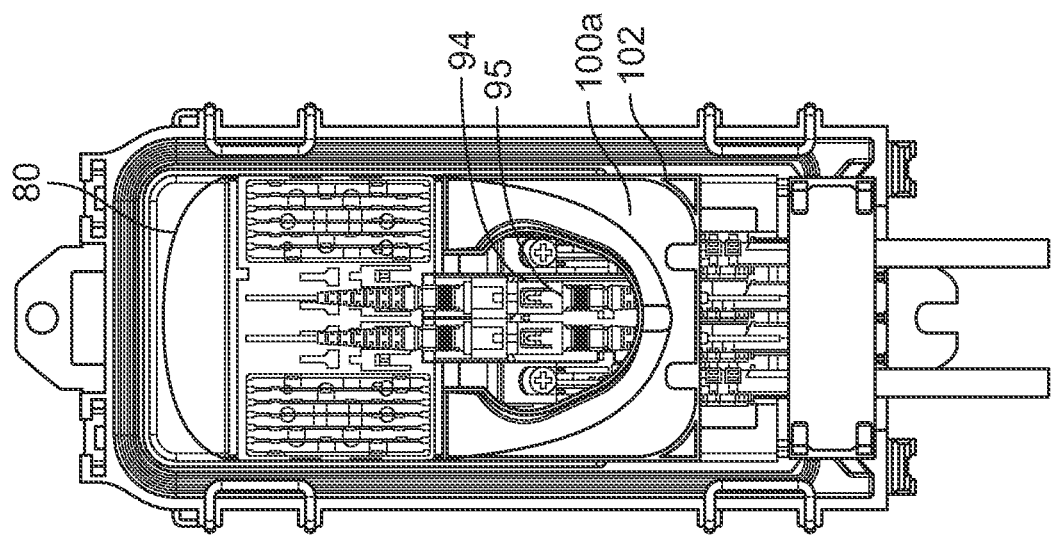
FIG. 21 is a front plan view of the enclosure of FIGS. 18-20.
Figure 22:
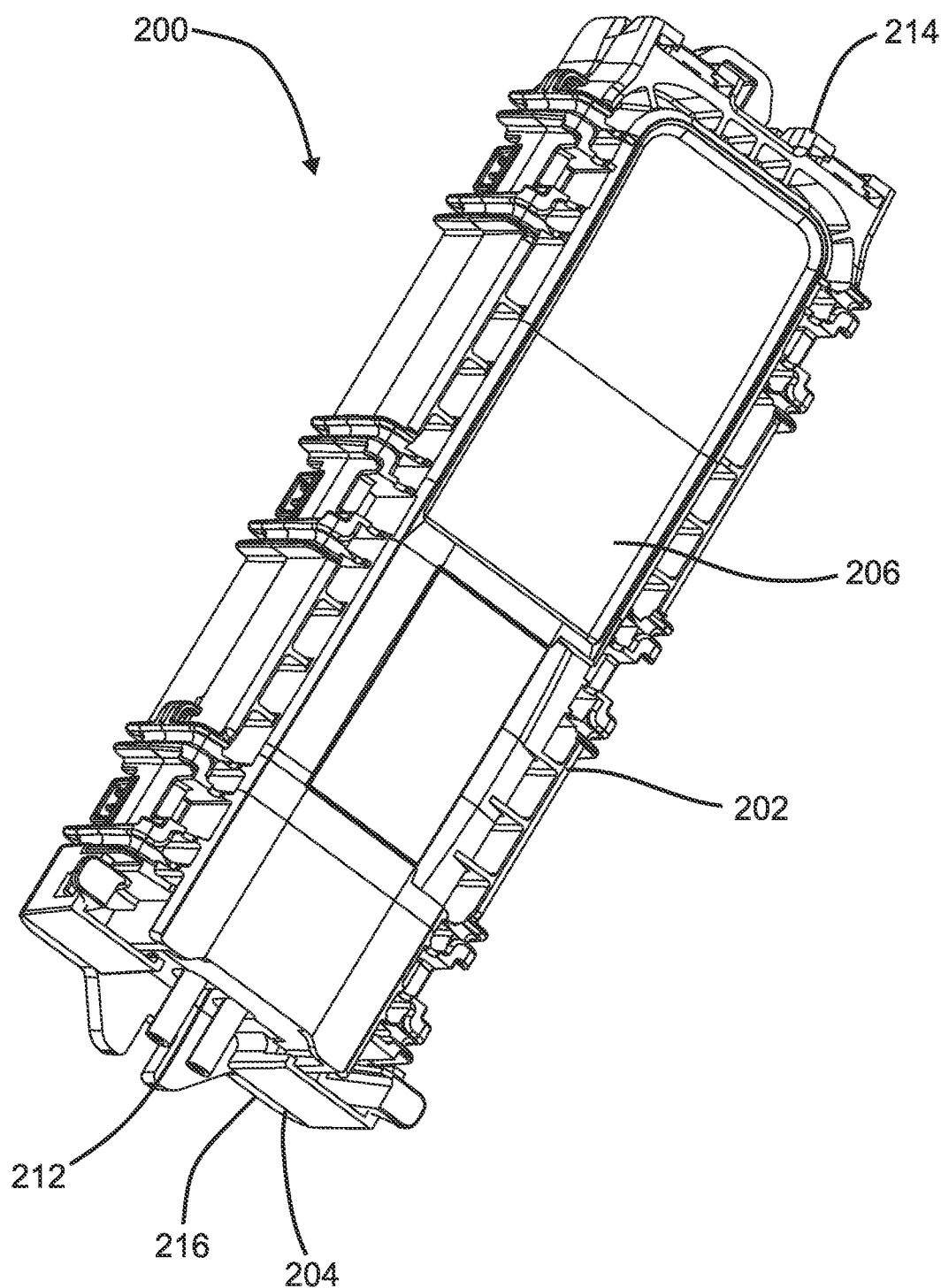
FIG. 22 is a perspective view of another enclosure in accordance with the principles of the present disclosure.
Figure 23:
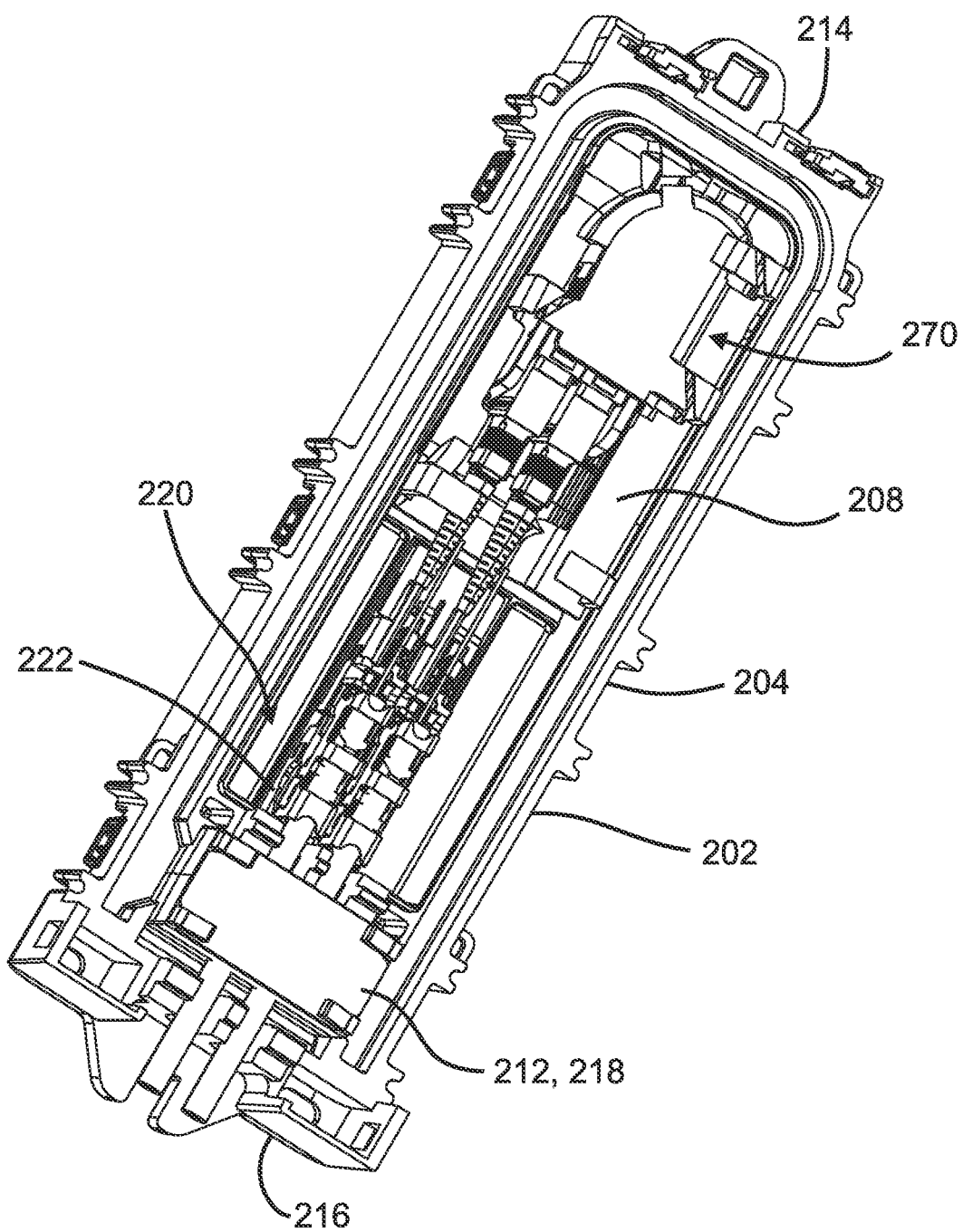
FIG. 23 is a perspective view of the enclosure of FIG. 22 with a main cover of the enclosure removed to reveal an interior of the enclosure.
Figure 24:
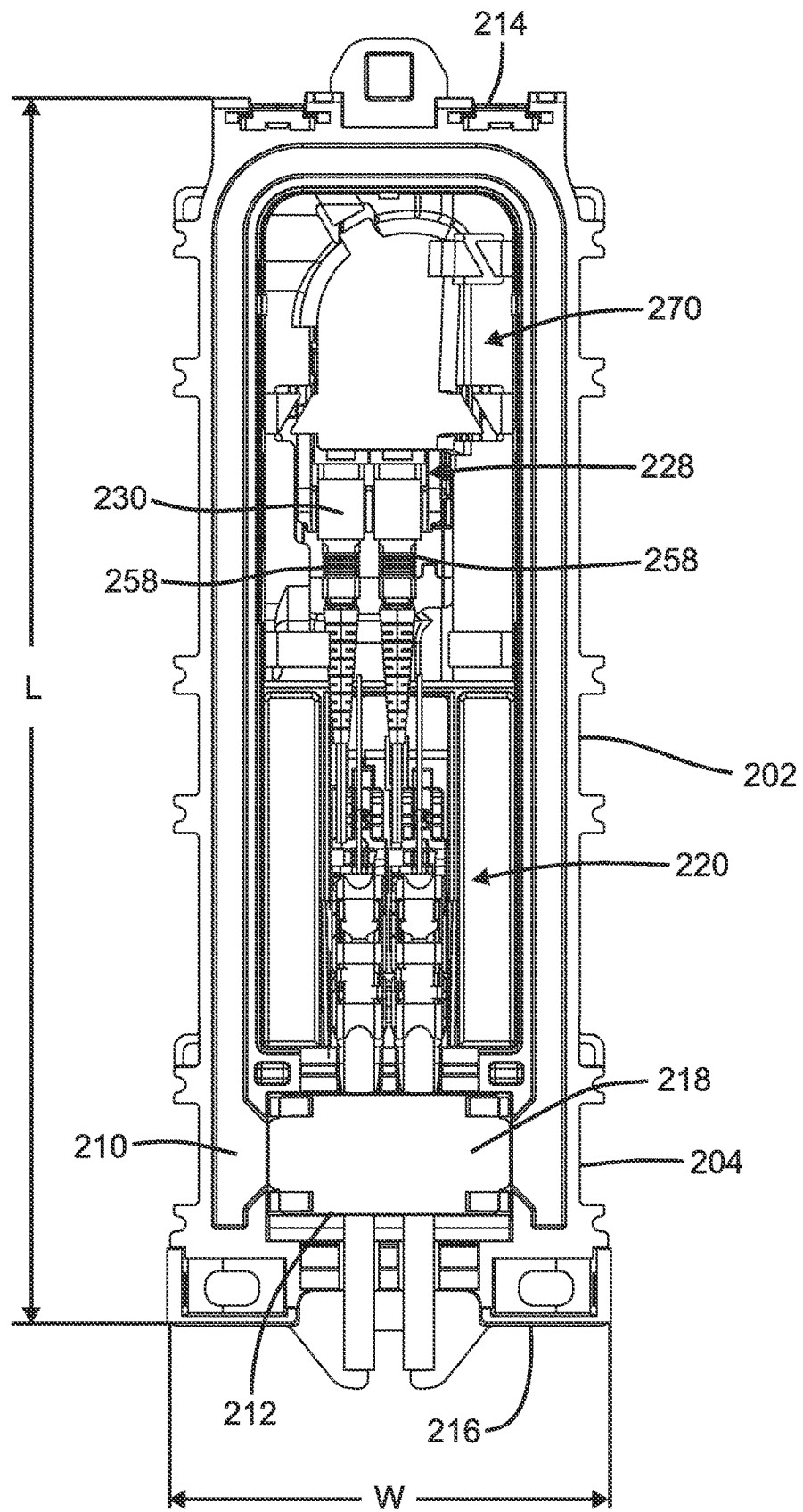
FIG. 24 is a plan view showing the interior of the enclosure of FIG. 23.
Figure 25:
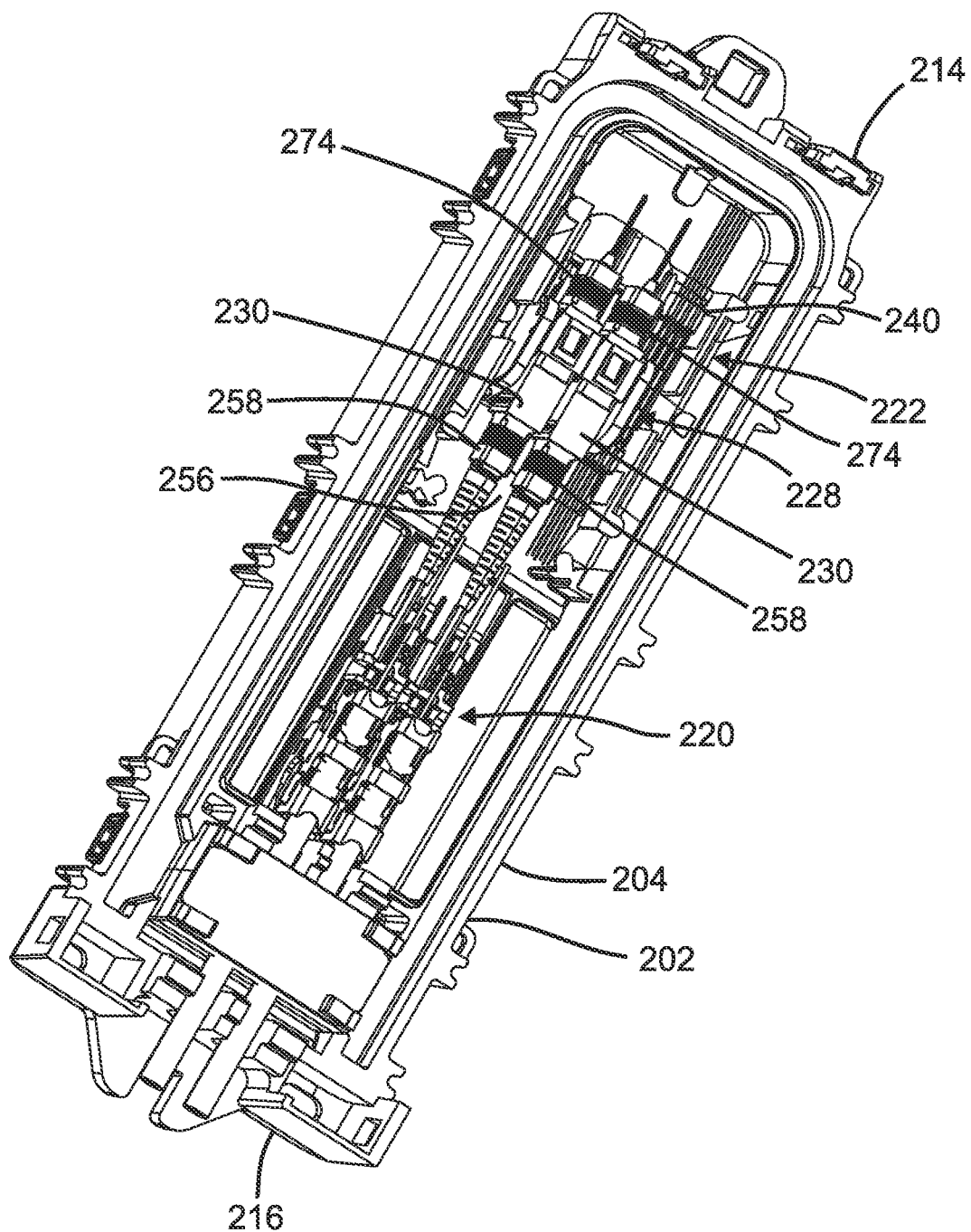
FIG. 25 is a perspective view showing the interior of the enclosure of FIG. 22 with an interior component cover removed.
Figure 26:
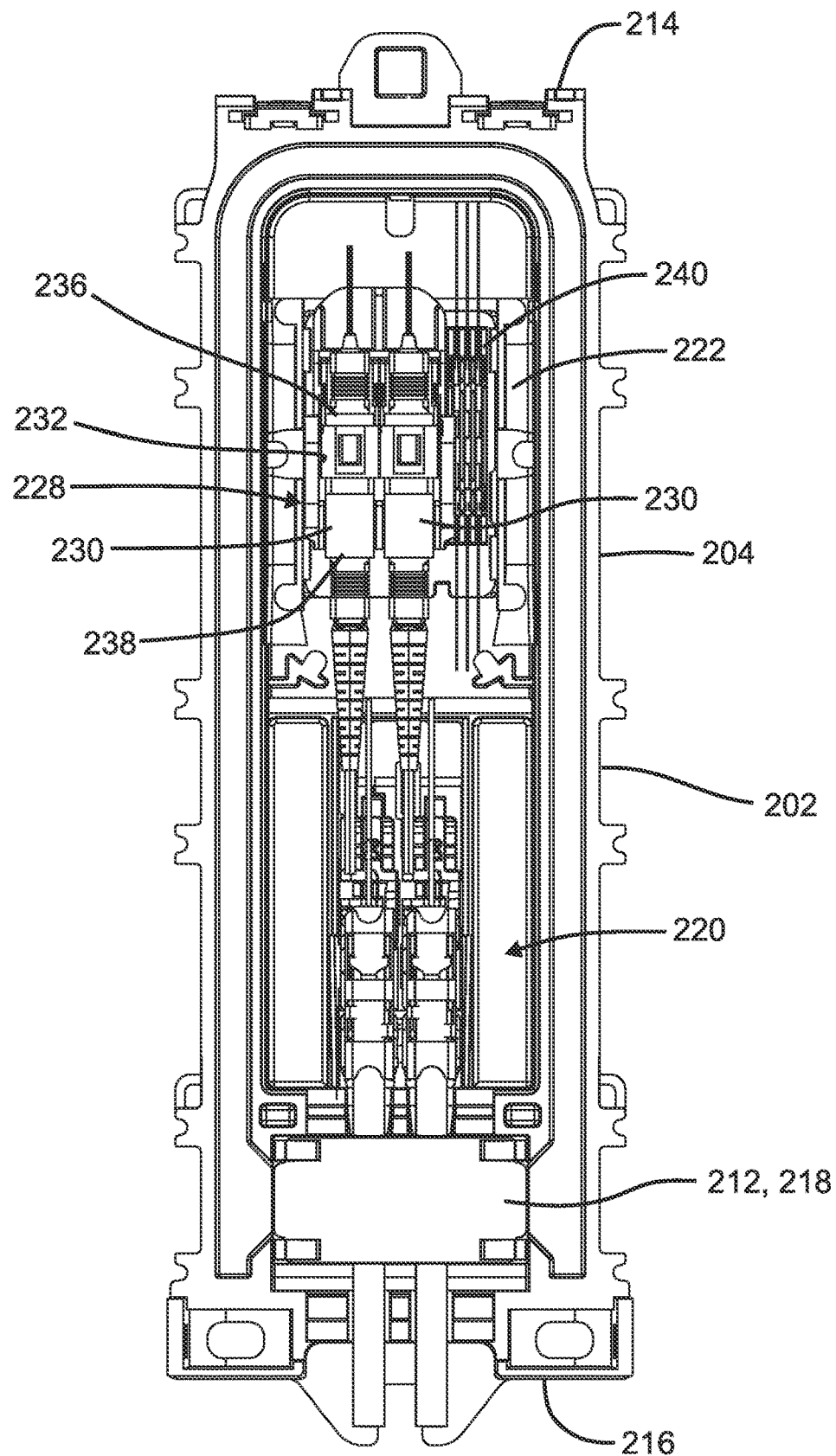
FIG. 26 is a plan view showing the interior of the enclosure of FIG. 25.
Figure 29:
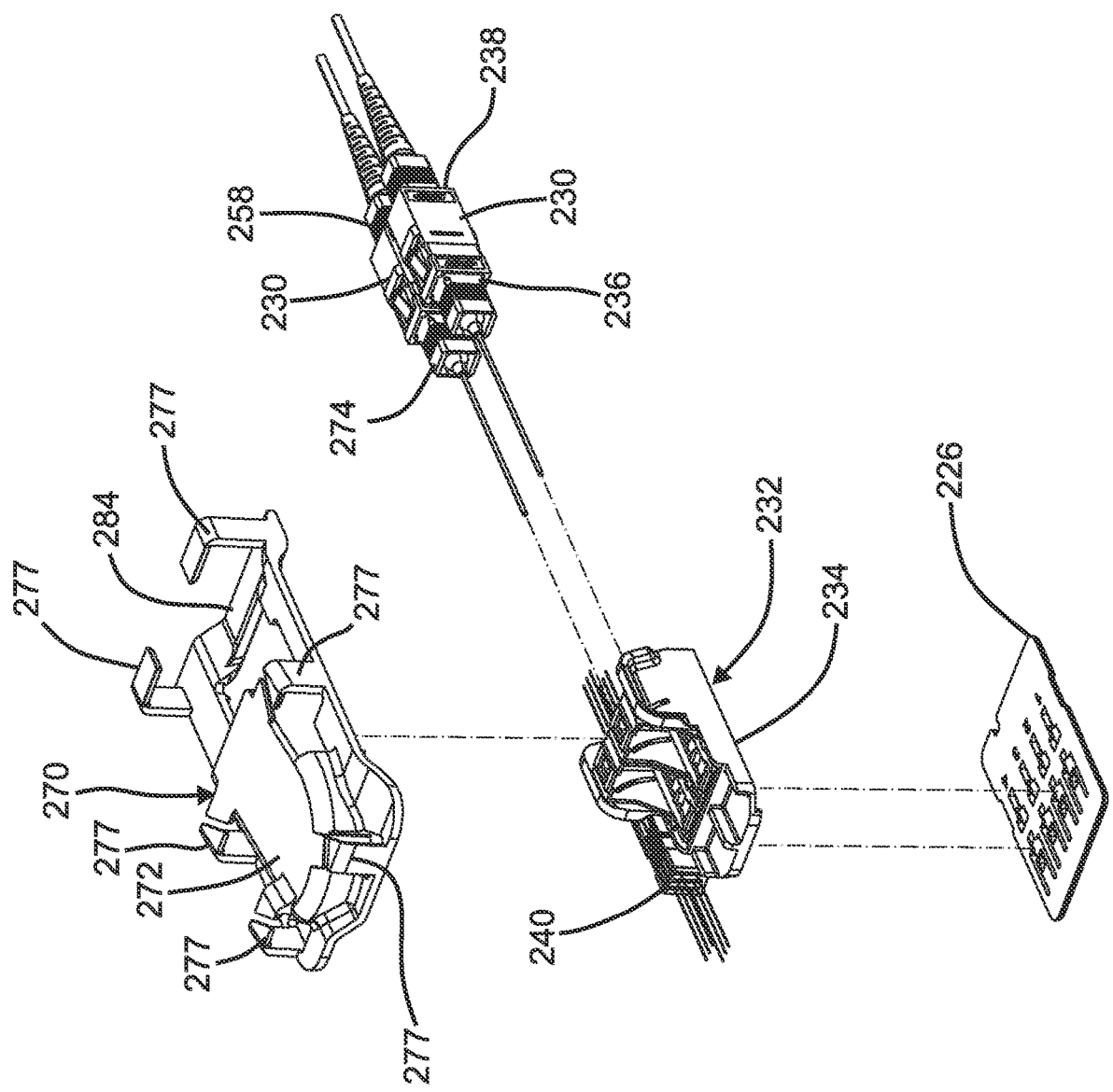
FIG. 29 is an exploded view of the component mounting assembly of FIGS. 27 and 28.
Figure 30:
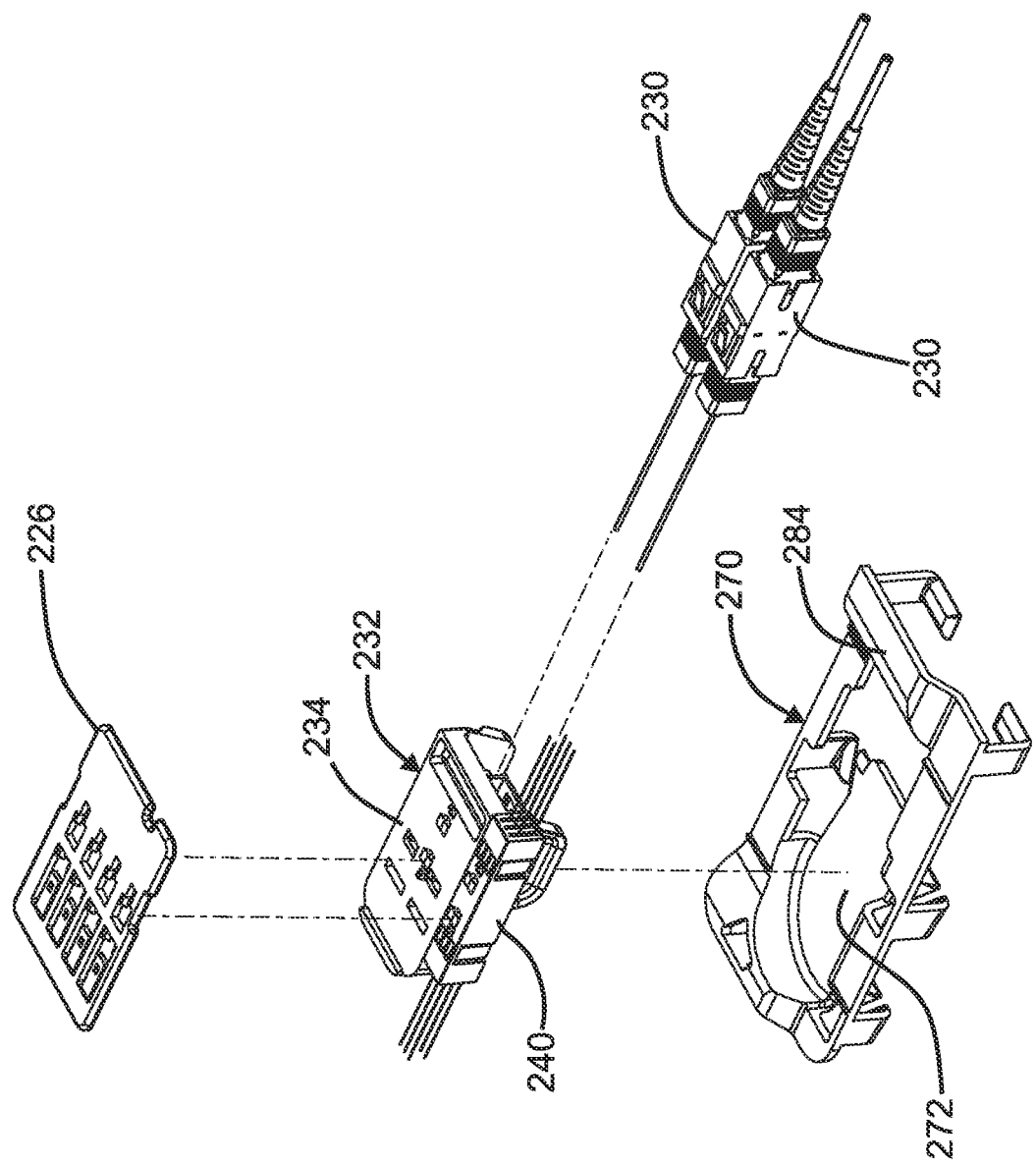
FIG. 30 is another exploded view of the component mounting assembly of FIG. 29.

As indicated previously, the fiber storage loop path 80 can be adapted to store excess fiber associated with optical fibers optically spliced together at splice locations held at the fiber optic component mounting region 74. In certain examples, the fiber storage loop path 80 can extend over, under or through the fiber optic adapter module 90. For example, the module frame 92 can define a fiber channel 100 (see FIGS. 15-17) that extends across a width of the module frame 92 at a location beneath a dedicated space corresponding to where fiber optic connectors plugged into the adapter ports 95 would be located. In one example, the fiber channel 100 can extend across a width of the cable anchoring region 76. In another example (see FIG. 18-21), a fiber channel 100a can be defined by a fiber guide 102 such that the fiber channel 100a extends across a width of the module frame 92 at a location over the module frame 92 and above a dedicated space corresponding to where connectorized pigtails 75a are routed to reach the adapter ports 95. In one example, the fiber guide 102 extends over the cable anchoring region 76 and is pivotally moveable relative to the base 22 (see FIG. 19) to facilitate accessing the adapter ports 95 of the fiber optic adapters 94.

As depicted at FIG. 14, the sealing blocks 44, 46 can be contained within a gel containment chamber 110 defined by the base 22 and the cover 24 at the second end 34 of the housing. The sealing blocks 44, 46 can be arranged incorporated in modules having frames 112 that support the sealant (e.g., gel) and leaf springs 114 for applying pressure to the sealant upon closing of the enclosure. In one example, a primary portion 110a of the gel containment chamber 110 can be defined by the base 22, the perimeter seal 50 can be held within the perimeter channel 52 defined by the base 22, and the base 22 can include snap-fit feature 116 (see FIG. 10) unitary with opposite side walls of the base 22. The snap-fit features 116 are preferably positioned deeper within the interior of the base 22 than the perimeter seal 50 and are adapted for engaging the frame 112 or leaf spring 114 of a corresponding one of the sealing blocks 44 to secure the first sealing block 44 within the primary portion 110a of the gel containment chamber 110. In a preferred example, the snap-fit structures 116 are directly adjacent to a floor or back of the base and engage frame portion or the leaf spring of the first sealing block 44. The base frame portion or leaf spring can be positioned at a side 117 of the first sealing block 44 opposite from a cable sealing/contacting side 119 of the first sealing block 44. The entire sealing block 44 is preferably flexed along its length to engage and interlock with the snap-fit features 116. The first sealing block 44 can flex into a spring expansion chamber 120 beneath the gel containment chamber 110 during flexing of the first sealing block 44 to engage the first sealing block 44 with the snap-fit structures 116. The snap-fit structures 116 can be ramped and can include retention surfaces 122. Most or all of the elastic flexing that occurs during interlocking of the first sealing block 44 with the snap-fit structures 116 is provided by the first sealing block 44.

In one example, a primary portion 110a of the gel containment chamber 110 can be defined between inner and outer sealant containment walls 130, 131 of the base 22. The inner and outer sealant containment walls 130, 131 can define cable pass-through openings 132 such as cable pass-through notches. The cover 24 can be configured to reinforce and stabilize the inner and outer sealant containment walls 130, 131 when the telecommunication enclosure 20 is closed. For example, the cover 24 can include an outer flange 134 adapted to overlap an outer side of the outer sealant containment wall 131 when the telecommunication enclosure 20 is closed, and the cover 24 can include an inner flange 136 adapted to overlap an inner side of the inner sealant containment wall 130 when the telecommunication enclosure 20 is closed. In this way, end portions of the inner and outer sealant containment walls 130, 131 are captured between the inner and outer flanges of the cover 24 when the enclosure is closed. In one example, the base 22 includes reinforcing walls 138 (e.g., ribs) integrally formed with the inner side of the inner sealant containment wall 130 and perpendicularly oriented with respect to the inner sealant containment wall 130. The reinforcing walls 138 can include notches 140 for receiving the inner flange 136 of the cover 24 when the enclosure is closed.

The cable anchoring modules 81 can be secured to the base 22 at the cable anchoring region 76 in alignment with the cable pass-through locations. In certain examples, the cable anchoring modules 81 each include a first attachment location 150 that attaches to (e.g., interlocks with) the cable anchoring plate 84 and a second attachment location 152 that attaches to (e.g., interlocks with) the inner sealant containment wall 130. In one example, the second attachment location 152 inhibits movement of the cable anchoring module 81 in an axial orientation (e.g., a cable pass-through orientation) and the first attachment location 150 inhibits movement of the cable anchoring module 81 in an orientation perpendicular with respect to the axial orientation.

Further details about the connection interfaces between modules and grids are disclosed by PCT International Publication No. WO2019/160995, which is hereby incorporated by reference in its entirety.

FIGS. 22-26 depict another enclosure 200 in accordance with the principles of the present disclosure. The enclosure 200 includes an elongate housing 202 including a base 204 and a main cover 206 that cooperate to enclose an interior 208 of the housing 202. The base 204 and the main cover 206 are movable relative to one another between an open position and a closed position. In certain examples, the base and the cover can be connected by a hinged coupling with hinges located at either side or either end of the enclosure. In certain examples, the main cover 206 can be disconnected from the base 204 (i.e., no hinges) when moved from the closed position to the open position. FIGS. 23-26 show the main cover 206 removed from the base 204 to provide access to the interior 208 of the housing 202.

In certain examples the telecommunications enclosure 200 is adapted for outdoor use and can be environmentally sealed. For example, a perimeter seal 210 (e.g., a gasket or other sealing element) can be provided for providing perimeter sealing between the base 204 and the main cover 206 when the housing 202 is in the closed position.

The enclosure 200 is configured to allow cables to be routed into the enclosure 200 in a sealed manner. For example, the enclosure 200 includes a cable pass-through location 212 for allowing cables to be routed in a sealed manner into the interior 208 of the enclosure 200. For the depicted example, the elongate housing 200 has a length L that extends between opposite first and second ends 214, 216. The cable pass-through location 212 is located at the second end 216 and includes a cable sealing arrangement 218 for environmentally sealing around cables routed into the housing 202 through the cable pass-through location 212. It will be appreciated that the cable sealing arrangement 218 can include a sealing material such as a sealing gel and can provide the dual function of sealing about the cables and providing sealing of the second end 216 of the housing 202. In the depicted example, the cable sealing arrangement 218 extends across a width W of the enclosure 200 and makes sealing contact with the perimeter seal 210 at opposite ends of the width. In certain examples, the cable sealing arrangement 218 can include one or more sealing blocks and can have a configuration of the type previously described herein.

The enclosure 200 also includes a cable anchoring region 220 provided within the base 204 adjacent to the cable sealing arrangement 218. The cable anchoring region 220 can be configured to secure cables routed through cable sealing arrangement 218 to the base 204 of the housing 202. In the depicted example, the cable anchoring region 220 includes an anchor mounting plate 222 snapped within a recess defined within the floor of the base 204. The cable anchoring plate can include an arrangement of openings adapted for allowing cable anchors to be secured to the mounting plate mechanically via the connections such as mechanical interlocks, snap-fit connections, slide fit connections or other connections as previously described herein. In certain examples, the cable anchoring region 220 can have a configuration that is similar to or the same as those previously described within this specification.

Figure 31:
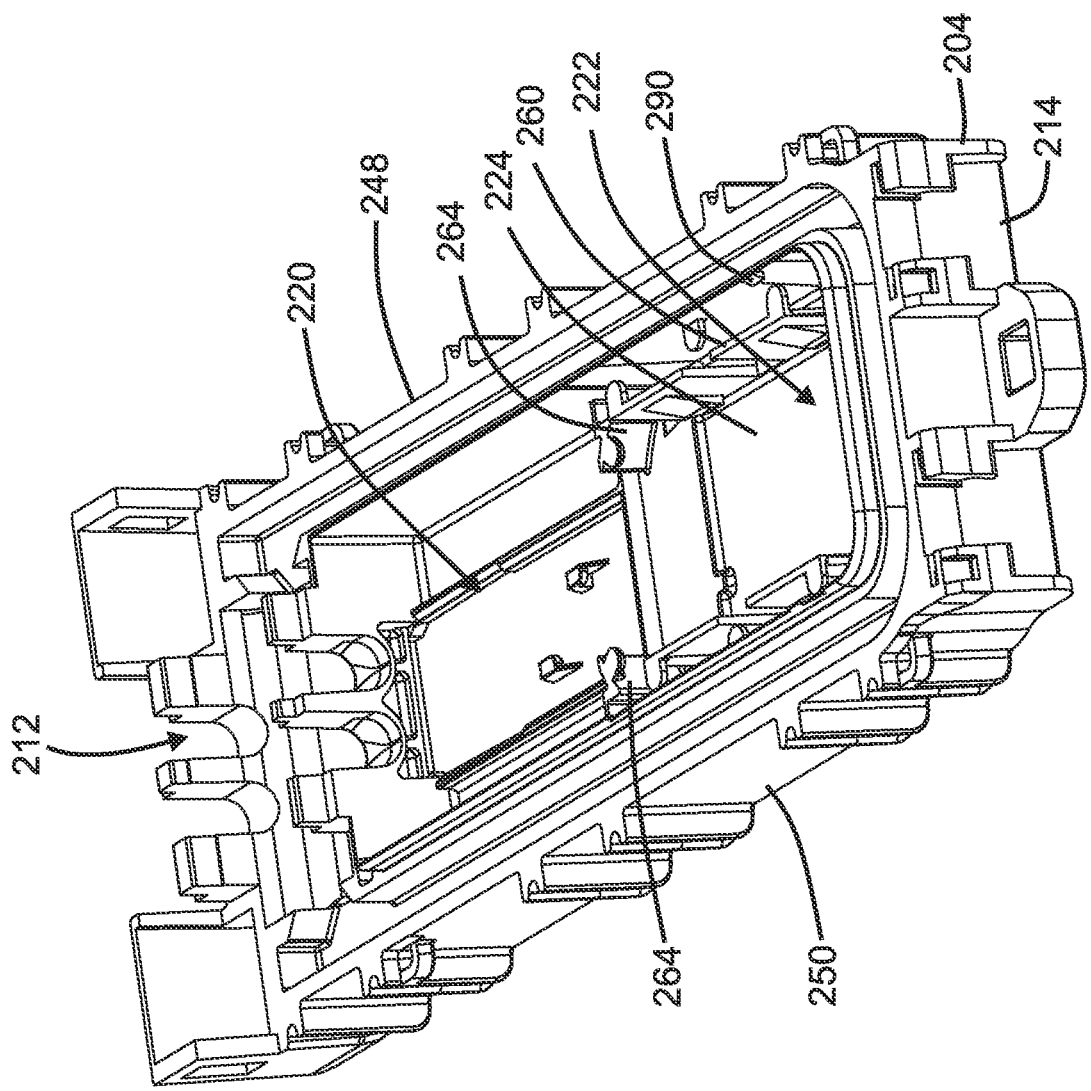
FIG. 31 is a perspective view showing an interior of the base of the enclosure of FIG. 22 with the interior components removed.
Figure 32:
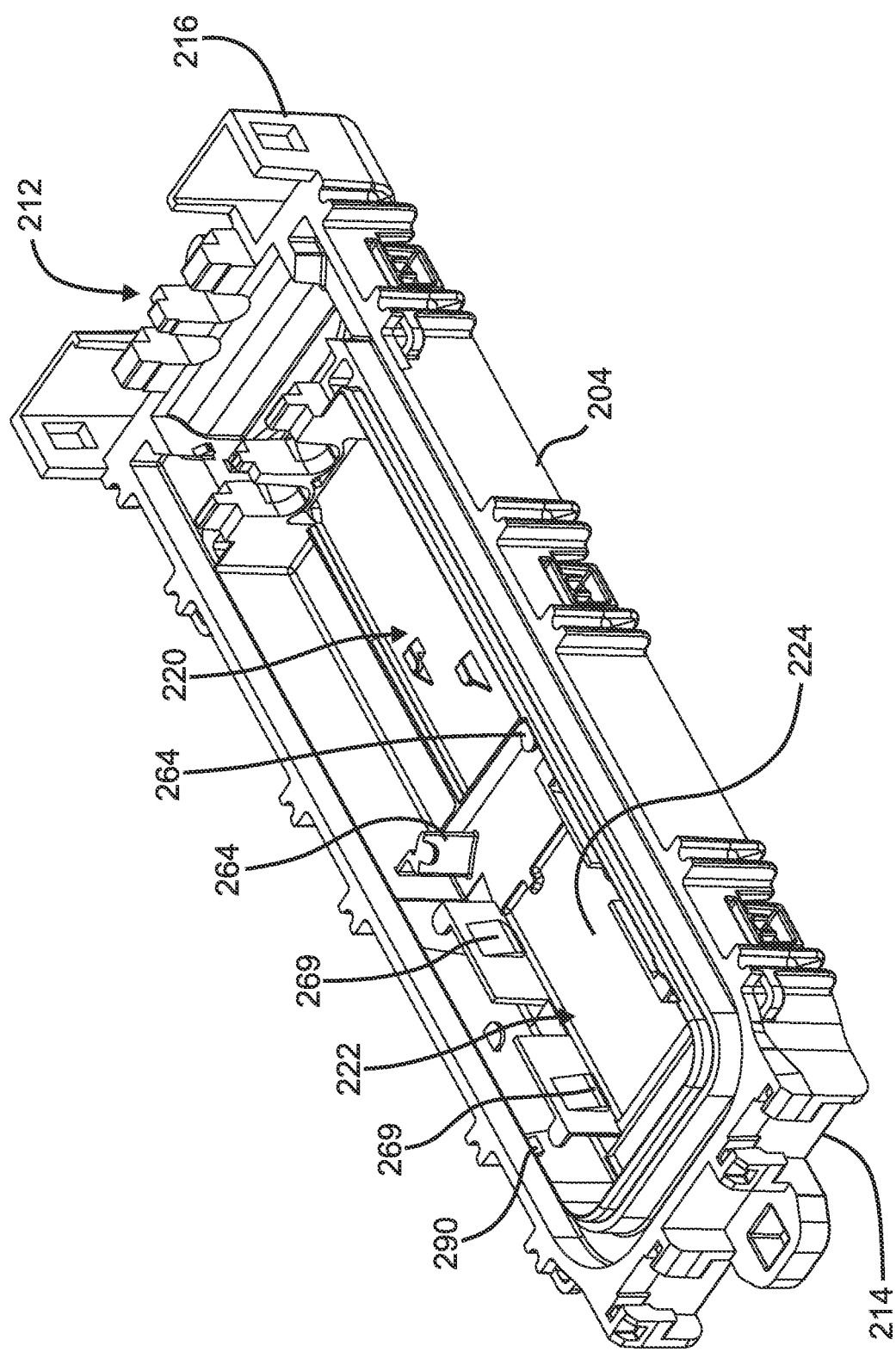
FIG. 32 is another perspective view of the base of FIG. 31.
Figure 33:
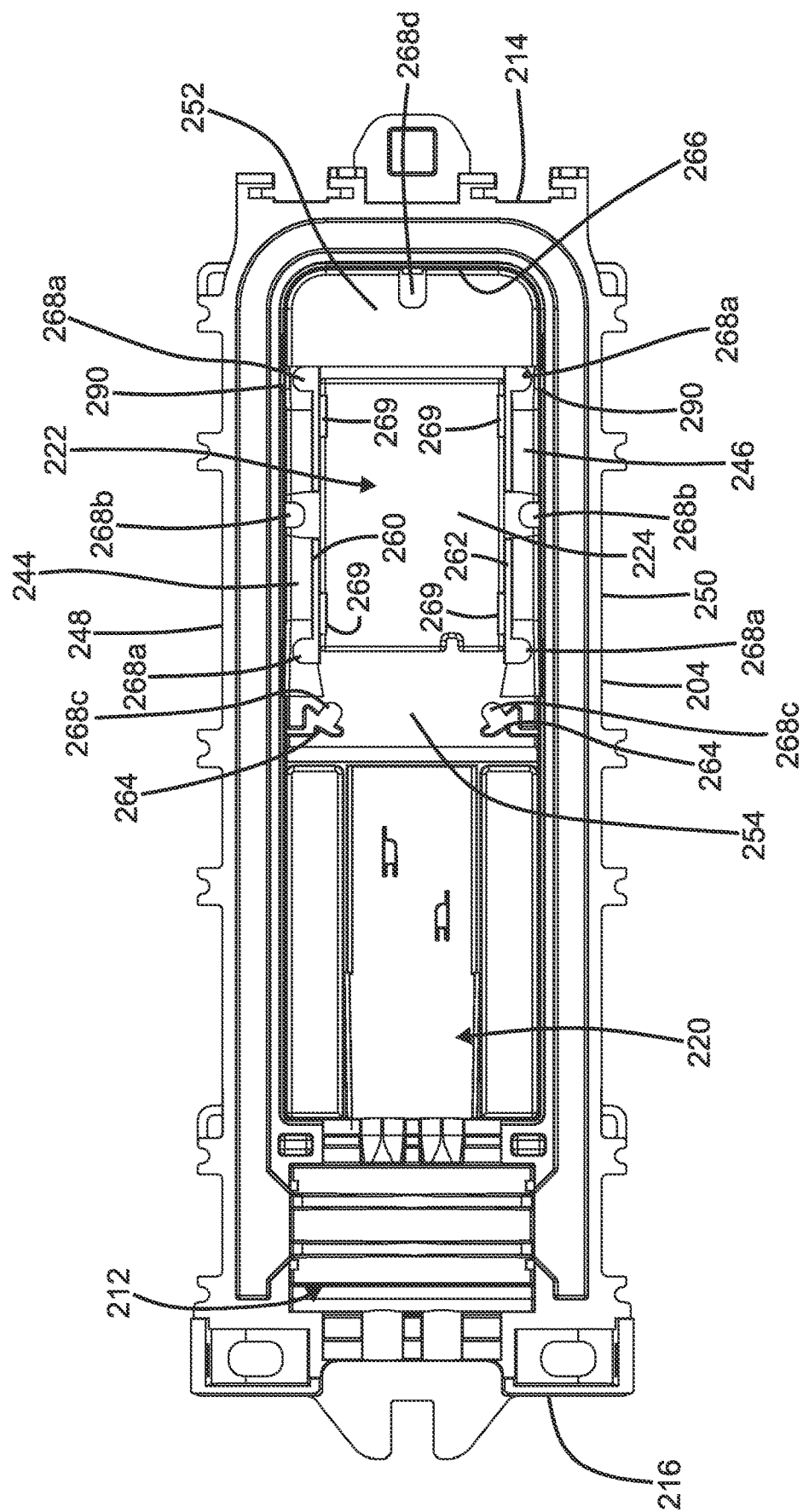
FIG. 33 is a plan view of the base of FIGS. 31 and 32.

The enclosure 200 further includes a component mounting region 222 located within the base 204 between the cable anchoring region 220 and the first end 214 of the elongate housing 202. The component mounting region 222 can be configured for mounting optical components to the base 204. Example types of components can include fiber optic adapter modules and optical component holding modules. Example optical component holding modules can include slots or other structures for receiving optical components such as splice sleeves, passive optical splitters and wavelength division multiplexers. In the depicted example, the component mounting region 222 includes a recess 224 (see FIGS. 31-33) defined within the base 204 for receiving component mounting plate 226 (see FIGS. 27-30) defining an arrangement of openings or other mechanical connection interfaces suitable for allowing components to be attached to the base 204 through the component mounting plate 226. In certain examples, components can secure to the component mounting plate 226 by a slidable, snap-fit connection that may include an intermating tongue and groove configuration or other type of interlock.

The enclosure 200 also includes a de-mateable connectorized patching region 228 that preferably includes at least one fiber optic adapter 230 that mounts at the component mounting region 222. In the depicted example, two of the fiber optic adapters 230 are provided. The fiber optic adapters 230 are shown integrated into an adapter module 232 having a module base 234 including a connection interface adapted to interconnect with the component mounting plate 226 to allow the adapter module 230 to be detachably secured to the component mounting plate 226. In one example, each of the fiber optic adapters 230 can be pivotally movable relative to the main body of the adapter module 232 to facilitate accessing first and second ports 236, 238 (see FIG. 26) of the fiber optic adapters 230. In the depicted example, the first connector ports 236 are oriented to face at least partially toward the first end 214 of the housing 202, while the second connector ports 238 are oriented to face at least partially toward the second end 216 of the housing 202.

The enclosure 200 is also depicted including a component holding module 240 (see FIGS. 25, 26, 29 and 30) that mounts to the component mounting plate 226 adjacent to the adapter module 232. The component holding module 240 can include a plurality of slots for receiving optical components such as splice protection sleeves, passive optical splitters, wavelength division multiplexers or the like. The component holding module 240 can also include a connection interface adapted to interlock with the component mounting plate 226 to secure the component holding module 240 to the base 204 at the component mounting region 222.

Figure 35:
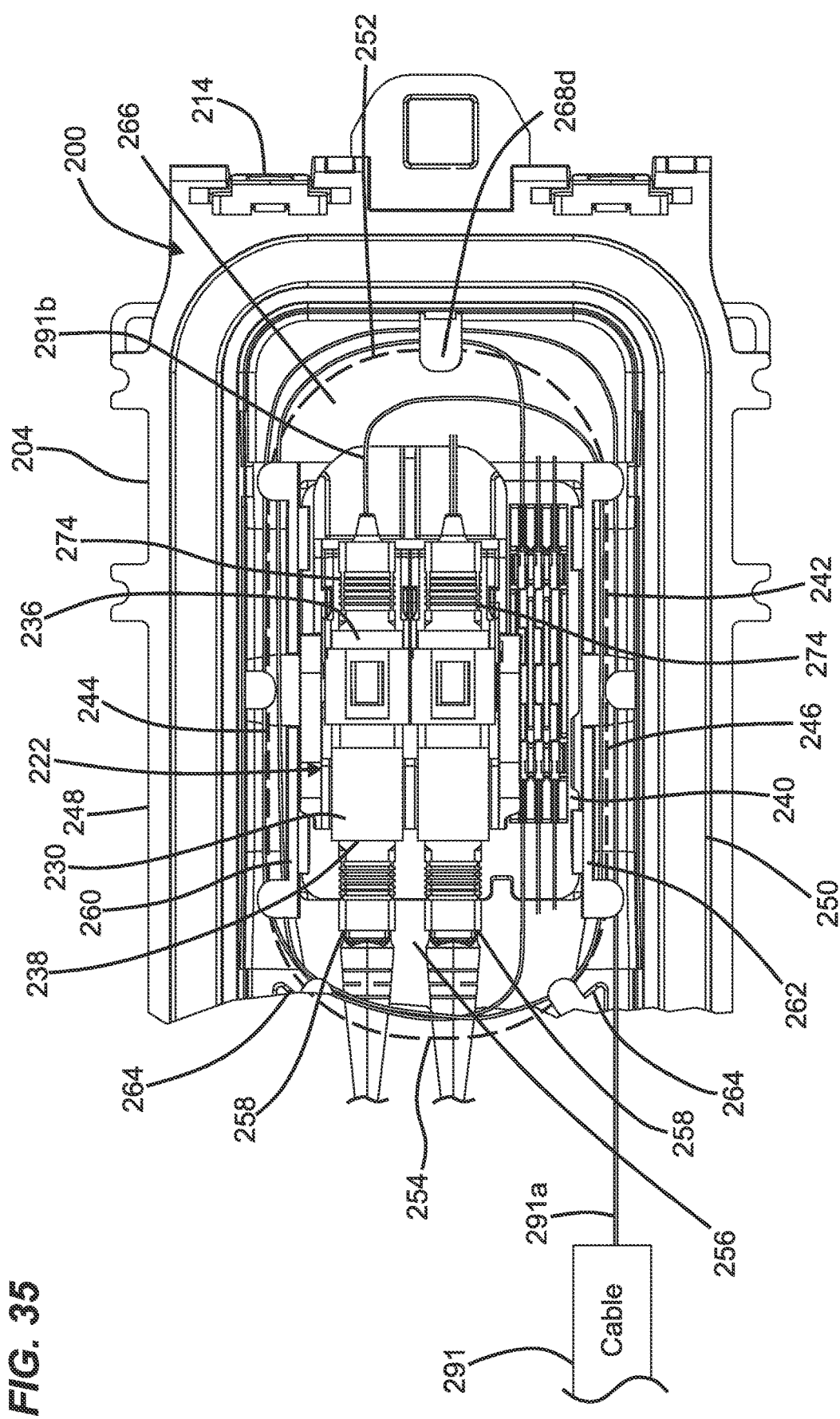
FIG. 35 is an enlarged view of a portion of FIG. 26 with example fiber routing added.

Referring to FIG. 35, the enclosure 200 includes a first fiber loop storage path 242 defined at a first level within the base 204. The first fiber loop storage path 242 surrounds the component mounting region 222 and includes first and second path length portions 244, 246 that extend along the length L of the elongate housing 202 respectively adjacent opposite first and second sides 248, 250 of the elongate housing 202. The first fiber loop storage path 242 also includes first and second path width portions 252, 254 that extends across the width W of the elongate housing 202 between the first and second path length portions 244, 246. The first path width portion 252 is adjacent the first end 214 of the elongate housing 202 and the second path width portion 254 extends under a space 256 dedicated for accommodating fiber optic connectors (e.g. connectors 258) inserted into the second connector ports 238 of the fiber optic adapters 230. In the depicted example, the first and second path length portions 244, 246 are defined between the first and second housing sides 248, 250 and first and second fiber guide walls 260, 262 that are inset with respect to their respective first and second sides 248, 250 of the housing 202. It will be appreciated that the fiber guide walls 260, 262 can be unitarily formed with the base 204 of the housing 202. The first and second path length portions 244, 246 are defined between the first and second fiber guide walls 260, 262 and their respective housing sides 248, 250. The second path width portion 254 can be defined at least in part by fiber guides 264 positioned along the width W of the housing 202. The fiber guides 264 can also be unitarily formed with respect to the base 204. The first path width portion 252 can be defined by an end wall 266 of the housing 202. The first fiber loop storage path 242 can further be defined by fingers or tabs that project over the first fiber loop storage path 242 to assist in obtaining optical fibers within the region defined by the first fiber loop storage path 242. In the depicted example, fiber retention tabs 268A are unitarily formed with the fiber guide walls 260, 262, fiber retention tabs 268B are unitarily formed with the housing side walls 248, 250, fiber retention tabs 268C are unitarily formed with the fiber guides 264 and fiber retention tabs 268D are unitarily formed the end wall 266.

Figure 36:
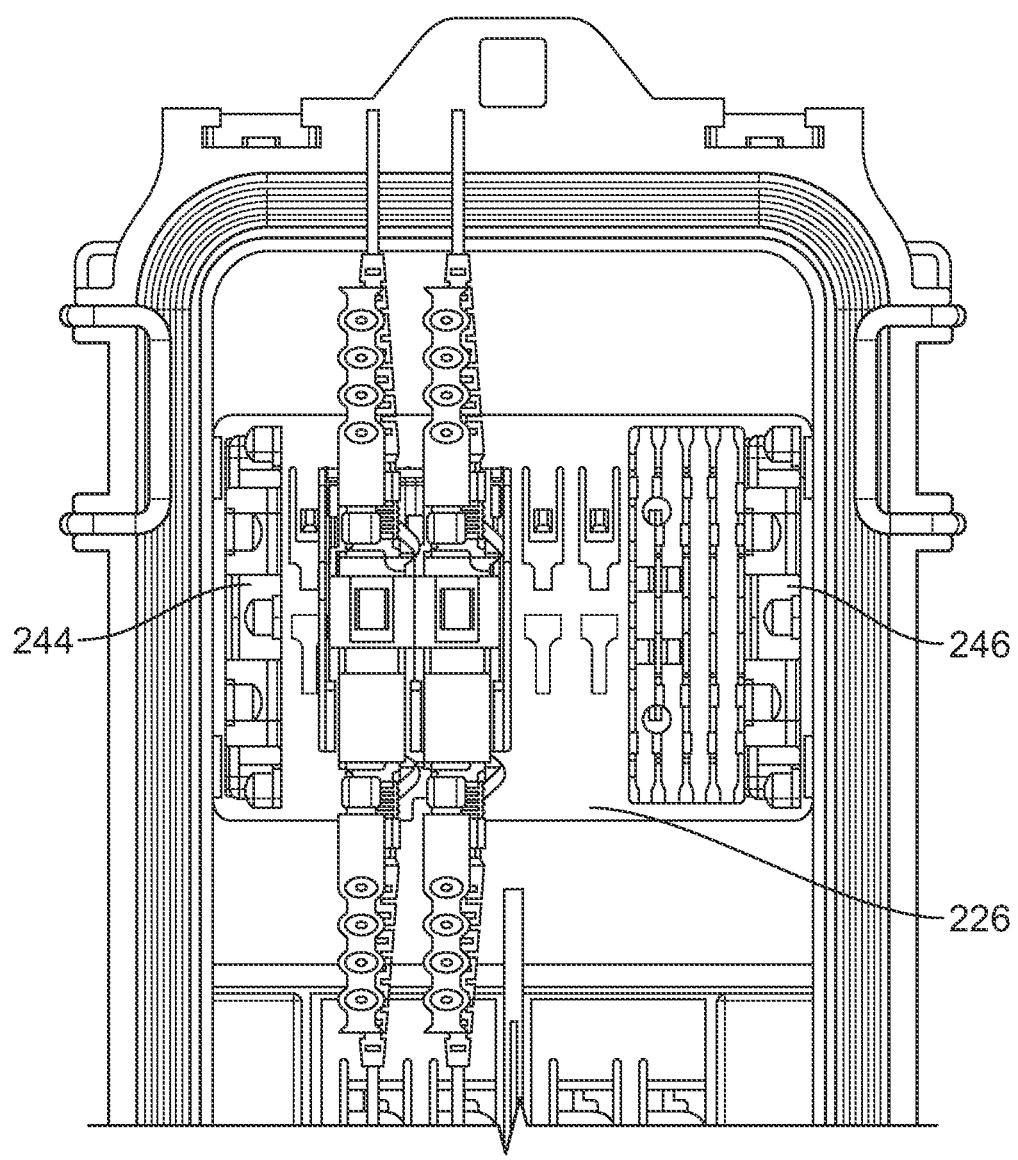
FIG. 36 depicts an alternative component mounting region in accordance with the principles of the present disclosure.
Figure 42:
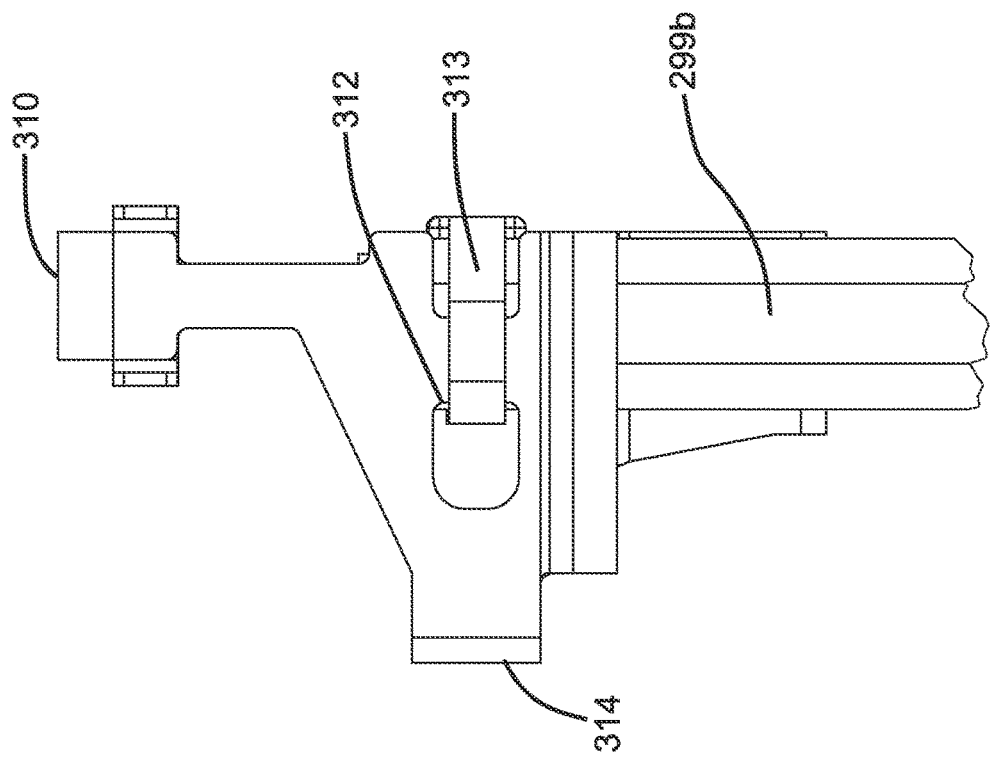
FIG. 42 is a side view of the cable anchor of FIG. 37.
Figure 41:
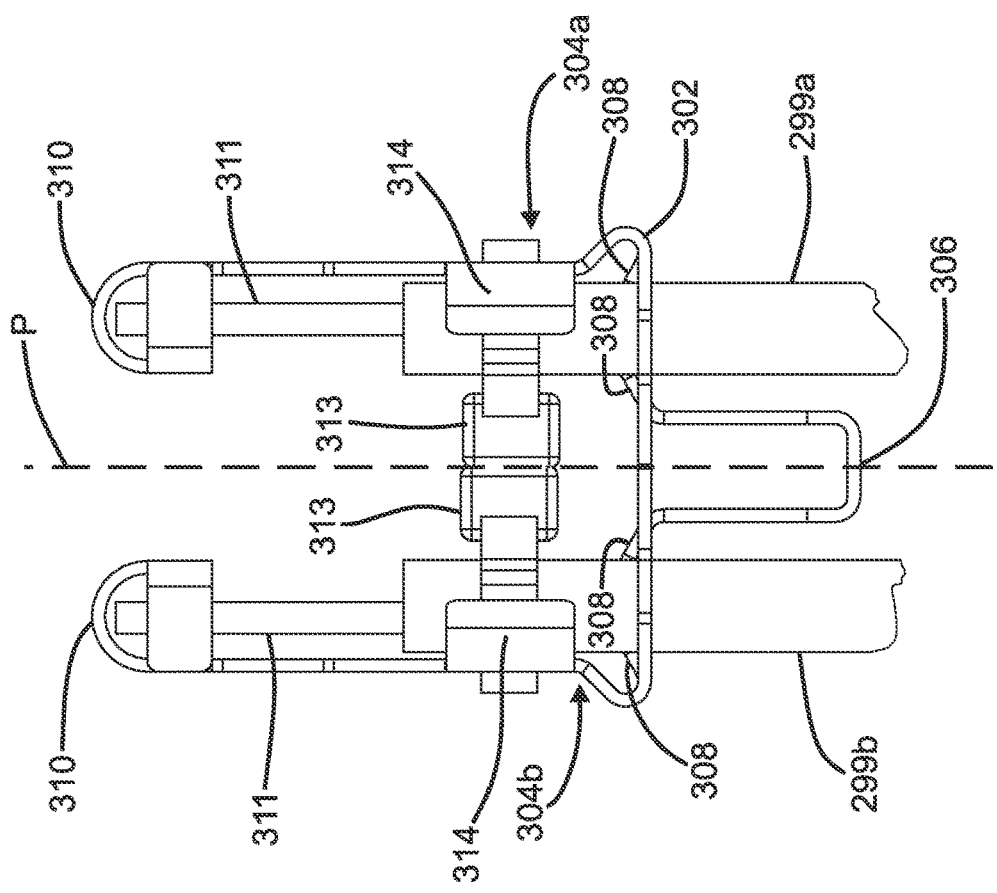
FIG. 41 is a bottom plan view of the cable anchor of FIG. 37.

In certain examples, the snap-fit features such as retention tabs 268 are integrated with the first and second fiber guide walls 260, 262. The snap-fit retention features can be adapted for retaining the component mounting plate 226 within the recess 224 of the base 204. In alternative examples, as shown at FIG. 36, the first and second path length portions 244, 246 can be defined by fiber guiding structures (e.g. fingers, tabs, walls, etc.) integrated with the component mounting plate 226.

Figure 34:
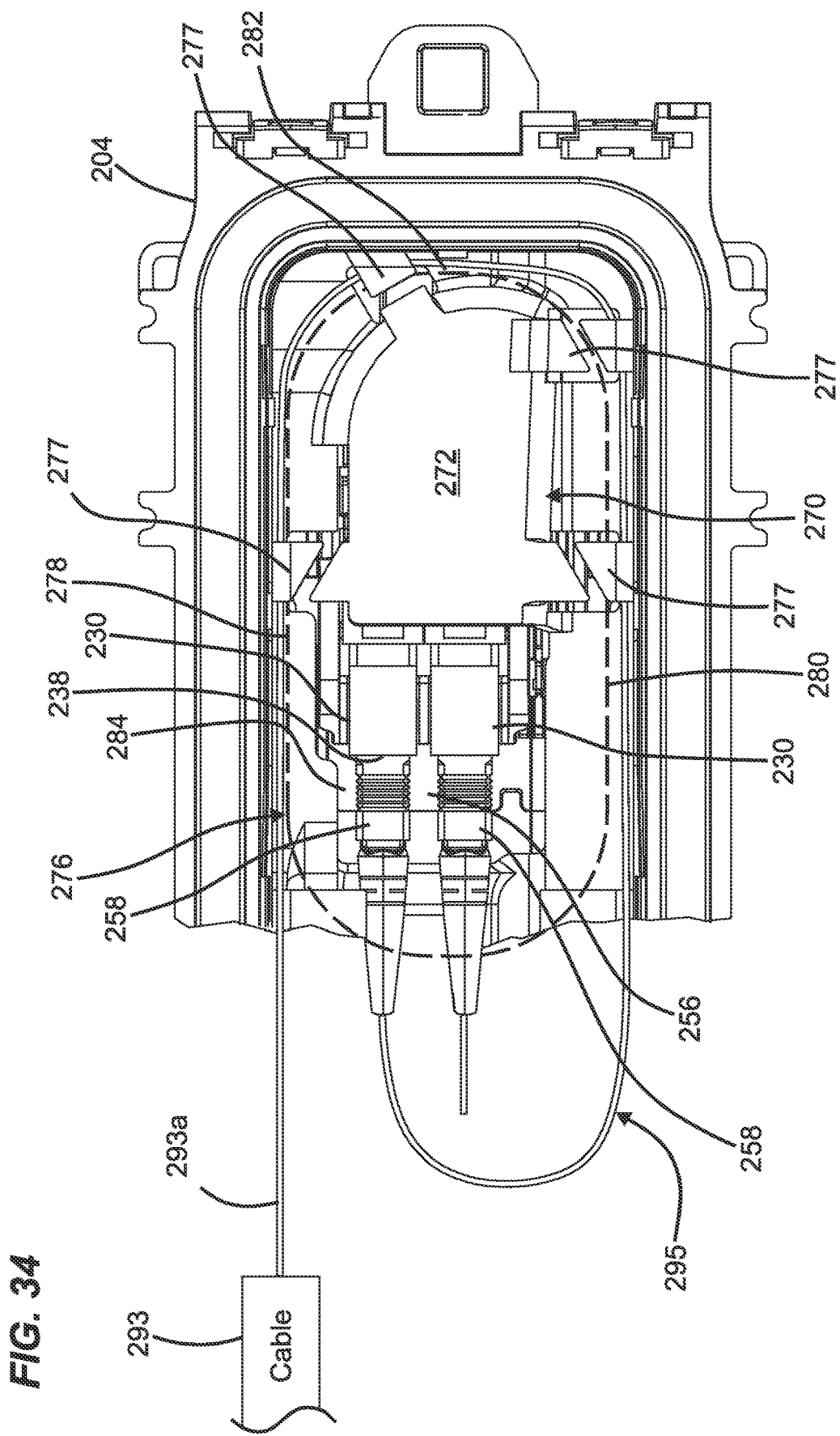
FIG. 34 is an enlarged view of a portion of FIG. 24 with example fiber routing added.

The enclosure 200 further includes an interior cover 270 that mounts to the base 204 for covering the first fiber loop storage path 242 and the component mounting region 222. The interior cover 270 is configured to block access to the first connector ports 236 of the fiber optic adapters 230 when the interior cover 270 is mounted to the base 204, but to not block access to the second connector ports 238. The interior cover 270 includes a vaulted portion 272 corresponding to the fiber optic adapters 230 for providing clearance for accommodating fiber optic connectors (e.g. connectors 274) inserted in the first connector ports 236 of the fiber optic adapters 232. Referring to FIG. 34, the interior cover 270 defines a second fiber loop storage path 276 provided at a second level of the housing 202 which is separated from the first level by the interior cover 270 when the interior cover 270 is mounted to the base 204. The second loop storage path 276 includes first and second path length portions 278, 280 that generally overlay the first and second path length portions 244, 246 of the first fiber loop storage path 242 when the interior cover 270 is mounted to the base 204. The second loop storage path 278 also includes a first path width portion 282 that generally overlays the first path width portion 252 of the first fiber loop storage path 242 when the interior cover 270 is mounted to the base 204. The interior cover 270 further includes a separator portion 284 adapted to cover the second path width portion 252 of the first fiber loop storage path 242 and to extend beneath the space 256 dedicated for accommodating the fiber optic connectors 258 inserted into the second connector ports 238 of the fiber optic adapters 230. In this manner, the separator portion 284 maintains separation between the first and second fiber loop storage paths 242, 276 in the vicinity of the second ports 238 of the fiber optic adapters 230.

The interior cover 270 provides separation and demarcation between the first fiber loop storage path 242 and the second fiber loop storage path 276. In certain examples, different types of optical fibers can be stored at each of the separate regions corresponding to the first fiber loop storage path 242 and the second fiber loop storage path 276. For example, in certain examples, optical fibers having a more robust degree of protection can be routed and stored at the second fiber loop storage path 276 and optical fibers having a lower degree of integrated protection can be stored at the first fiber loop storage path 242. For example, the optical fibers looped at the first fiber loop storage path 242 can include coated optical fibers and/or buffered optical fibers that are not protected by additional cable jacketing or strength numbers such as Aramid yarn. In contrast, the optical fibers looped at the second fiber loop storage path 276 can have more robust integral protection such as protection provided by cable jacketing that may optionally contain strength numbers such as Aramid yarn. In certain examples, the optical fibers at the second fiber loop storage path 276 can be connectorized pigtails.

In certain examples, the optical fibers of first and second different cables 291, 293 routed into the enclosure 200 can be optically connected to one another at the de-mateable connectorized patching region 228. For example, referring to FIG. 35, the first cable 291 can include optical fibers 291a that are routed to the first level and are looped within the first fiber storage path 242. Such fibers can be stripped to include coated fibers (e.g., fibers coated with an acrylate layer having a diameter such as 200 or 250 microns) or can include loose or tight buffered fibers protected by a buffer layer having an outer diameter typically in the neighborhood of 900 microns. The optical fibers 291a can be spliced to the stub ends of optical fibers 291b terminated within the fiber optic connectors 274 provided within the first ports 236 of the fiber optic adapters 230. The stub fibers 291b can also be coated optical fibers or buffered optical fibers and can also be stored within the first fiber loop storage path 242. It will be appreciated that the ability to loop the optical fibers within the first fiber loop storage path 242 provides sufficient fiber length to provide for effective splicing and re-splicing between the optical fibers. It will also be appreciated that splices between the optical fibers can be protected within splice sleeves that are held within the component holding module 240.

In certain examples, the second fiber optic cable 293 can include fibers 293a in the form of connectorized pigtails 295 with connectors 258 of the connectorized pigtails 295 being pre-terminated on the fibers 293a of the second fiber optic cable 293. Excess length corresponding to the connectorized pigtails can be managed by looping the connectorized pigtails along the second fiber loop storage path 276 prior to plugging the connectorized ends of the connectorized pigtails 295 into the second connector ports 238 of the fiber optic adapters 230. It will be appreciated that the connectors 258 are representative of the connectorized ends of the connectorized pigtails 295.

In certain examples, the second fiber loop storage path 276 can be defined at least in part by a plurality of fiber guide members 277 such as protections, fingers, tabs, walls or the like that are integrated with the interior cover 270. In certain examples, fiber guide members can include portions that extend over the second fiber loop storage path 276 to assist in providing retention of the optical fibers on the path 276.

In certain examples, the interior cover 276 and/or the housing 202 can include structure for allowing the interior cover 270 to be hooked, secured or otherwise attached to the housing 202 when the interior cover 270 has been removed from the base 240 to provide access to the component mounting region 222. Additionally, in certain examples, the interior cover 270 can include one or more connector retainers or holders capable of temporarily holding fiber optic connectors such as the fiber optic connectors corresponding to connectorized pigtails when the cover 270 is removed from the base 204. For example, prior to removing the interior cover 270 from the base 204, the connectors 258 are removed from the second ports 238 and can be secured or stowed with the interior cover 270 as the cover is removed from to maintain protection and organization of the pigtails.

In certain examples, the interior cover 270 can rest upon the top/front ends of the first and second fiber guide walls 260, 262 when mounted over the component mounting region 222. Snap members 290 can be integrated with the sides 248, 250 of the base 240 to assist in securing the interior cover 270 to the base 204. In certain examples, press locations can be provided on the vaulted portion 272 of the cover 270 to facilitate disengaging the cover 270 from the snap features 290 when it is desired to remove the cover 270 from the base 204.

FIGS. 37-42 depict an example cable anchoring device 300 adapted for securing two cables such as two flat drop cables 299a, 299b to the enclosure 200. In a preferred example, the cable anchoring device 300 is adapted to interlock with (e.g., snap interlock with) the component mounting region 222 provided at the cable anchoring region 220. The cable anchoring device 300 includes a sheet metal unit 302 including first and second cable anchoring locations 304a, 304b interconnected by a central portion 306 of the sheet metal unit 302 that extends across a midplane P between the first and second cable anchoring locations 304a, 304b. Each of the first and second cable anchoring locations 304a, 304b includes: a) a set of opposing blades 308 adapted to embed in the jacket of a cable; b) a closed ended pocket 310 forming a strength member stop for limiting pistoning of a strength member 311 of the cable relative to the cable jacket; and c) a cable tie location 312. Cable ties 313 are shown at the cable tie locations 312. The sheet metal unit 302 also including first and second latches 314 positioned respectively beneath the first and second cable anchoring locations 304a, 304b for securing the sheet metal unit 302 to the component mounting region 222. The first and second cable anchoring locations 304a, 304b are symmetric about the midplane P that bisects the sheet metal unit 302.

Figure 43:
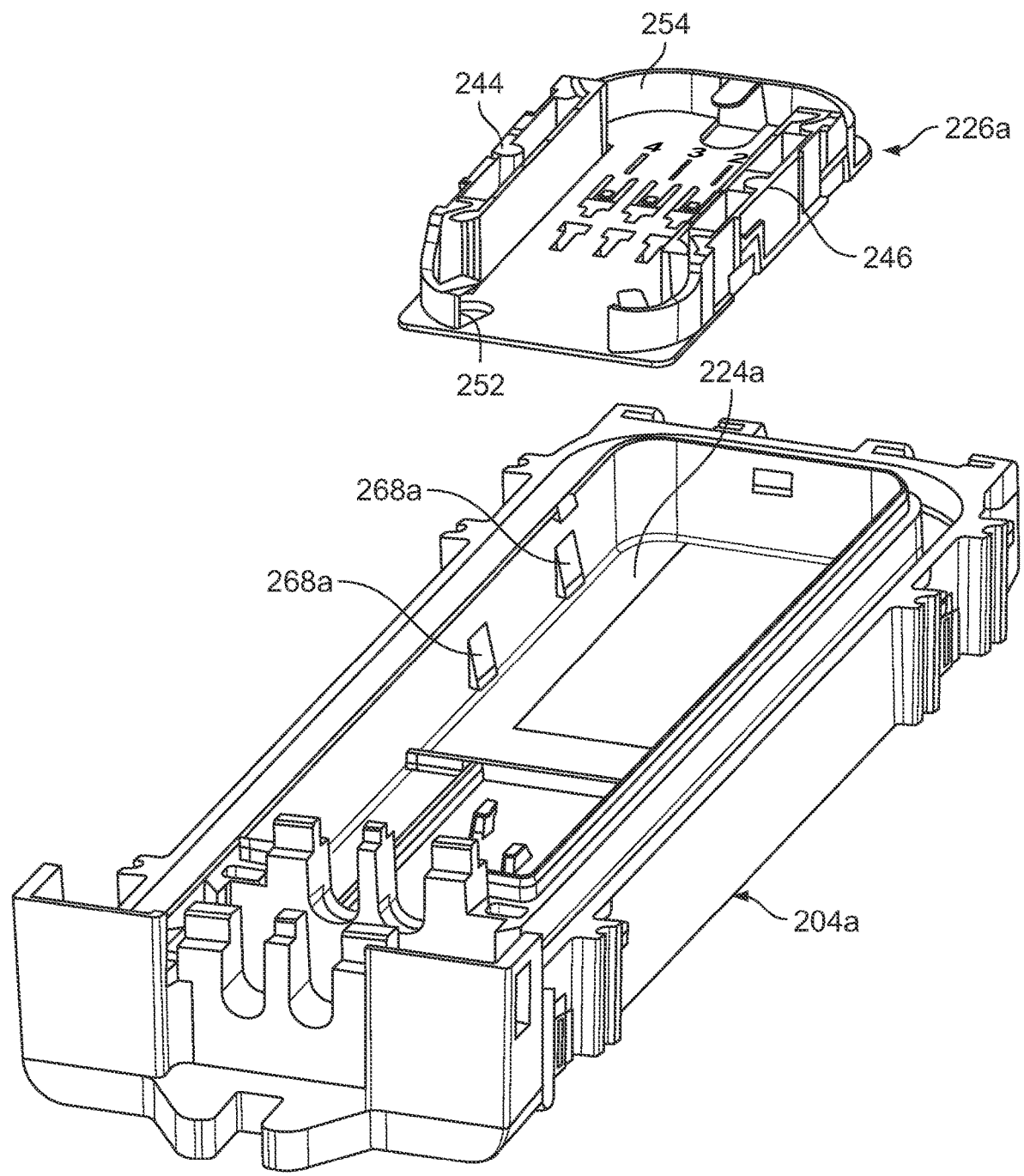
FIG. 43 is an exploded view of an alternative base and component mount plate usable with the enclosure of FIG. 22.
Figure 44:
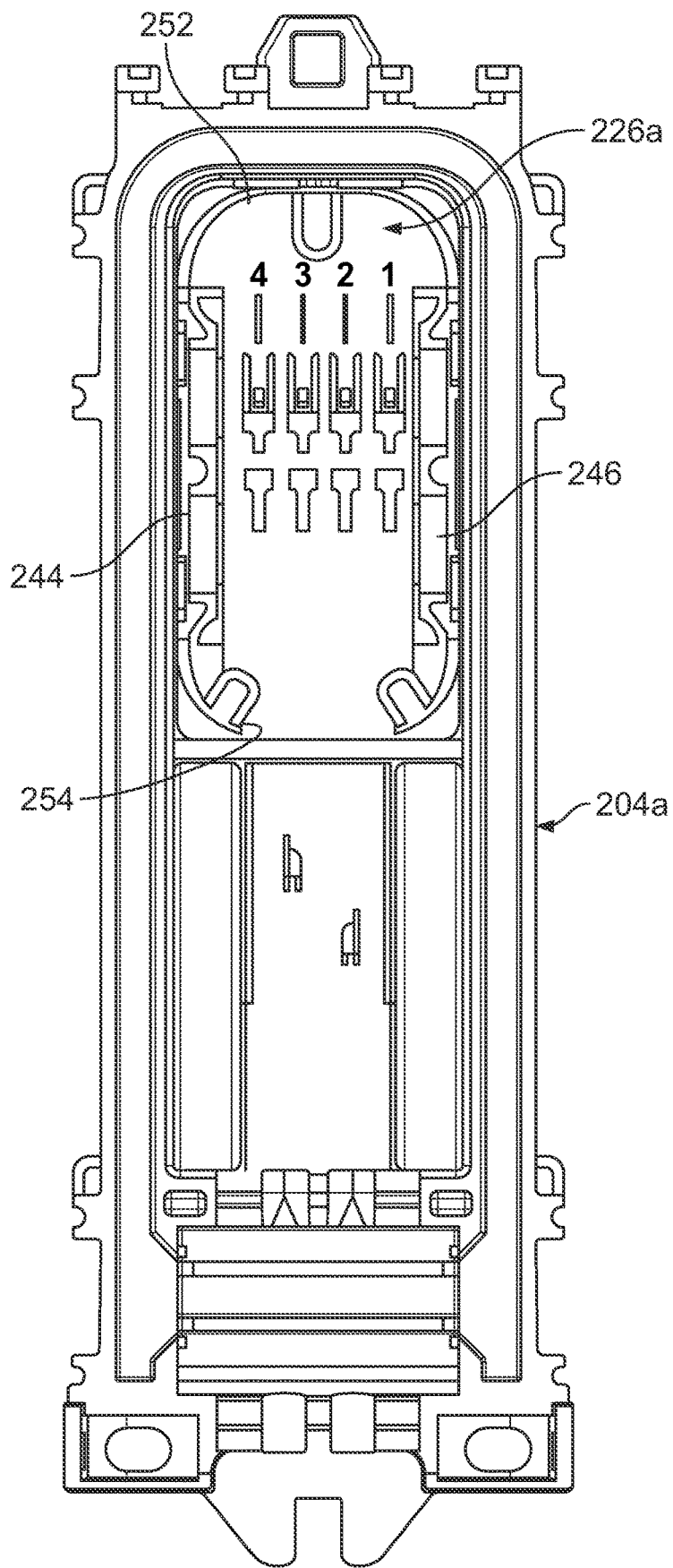
FIG. 44 is a plan view of the base and component mounting plate of FIG. 43.
Figure 45:
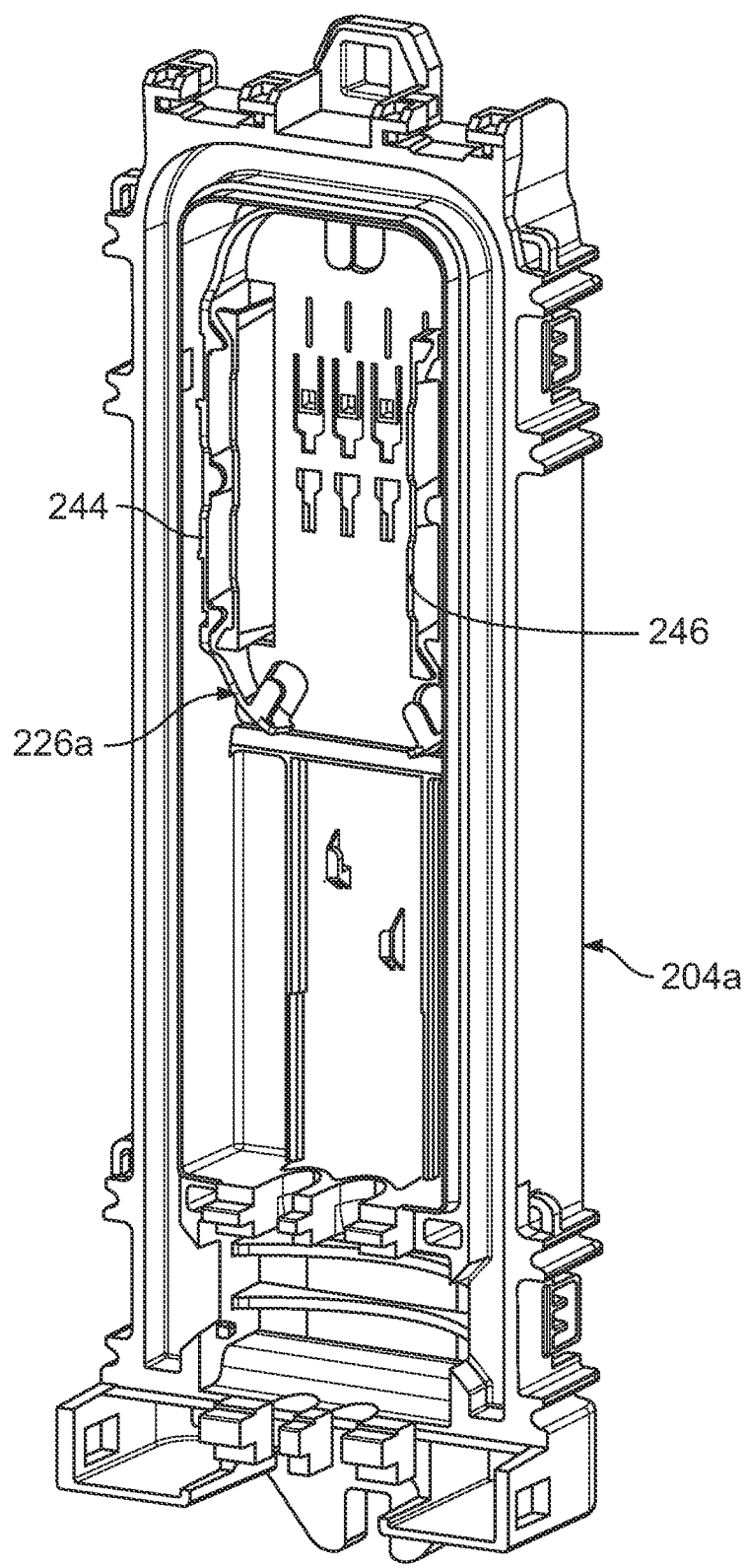
FIG. 45 is a perspective view of the base and component mounting plate of FIG. 43.
Figure 46:
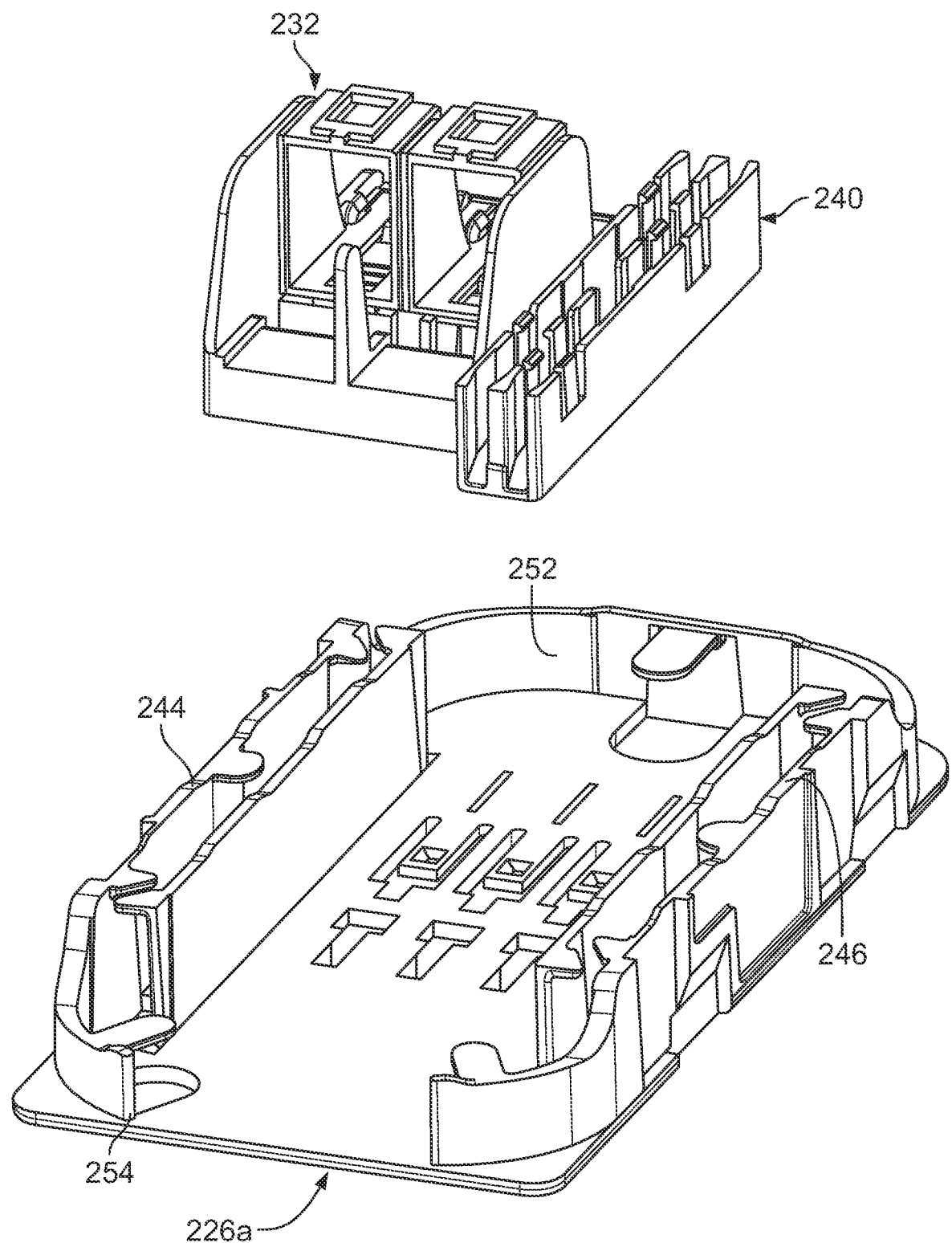
FIG. 46 is an exploded view showing the component mounting plate of FIG. 43 in combination with a fiber optic adapter module and a component holder adapted to be mounted to the component mounting plate.
Figure 47:
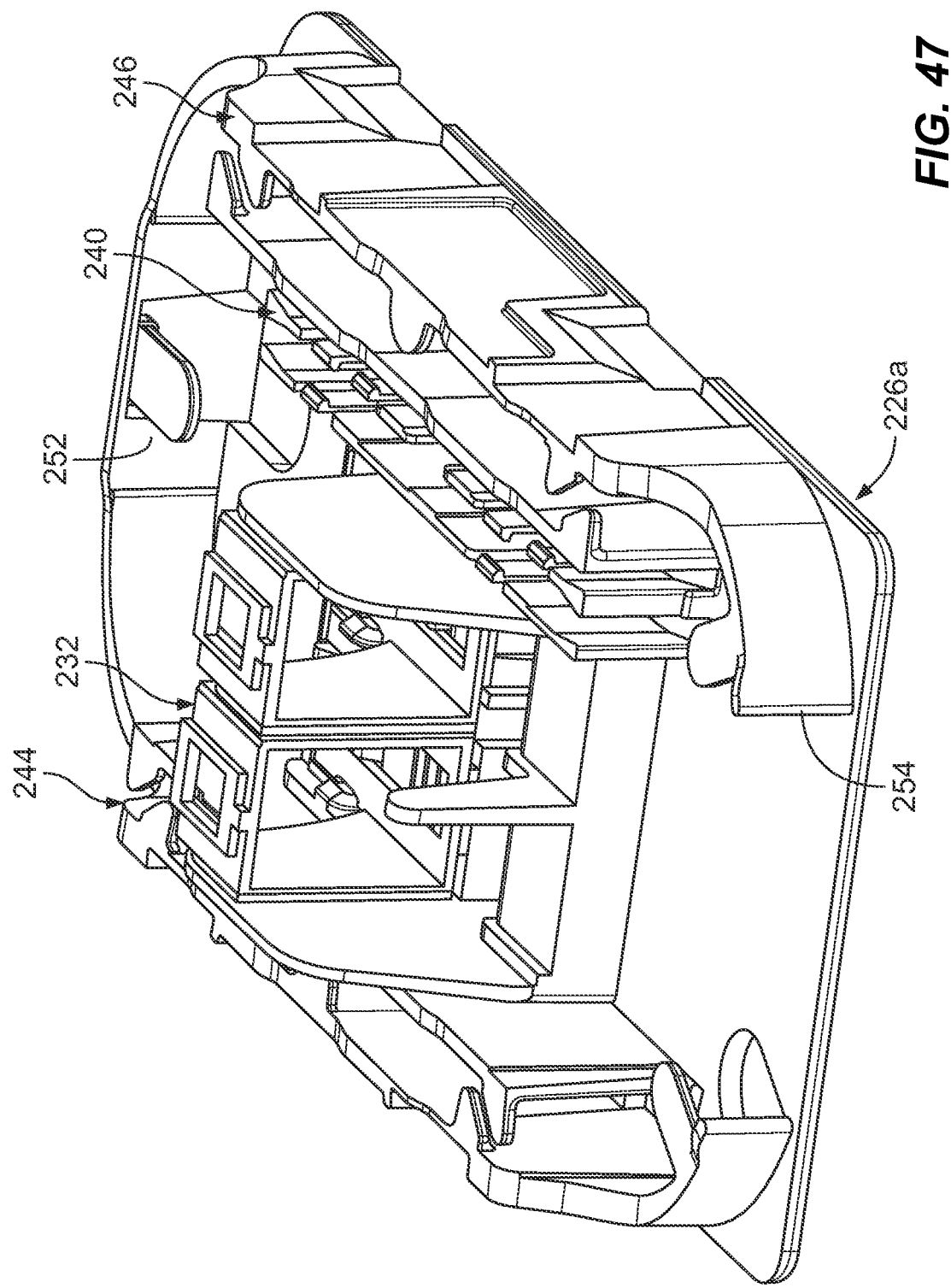
FIG. 47 depicts the fiber optic adapter module and component holder of FIG. 46 mounted to the component mounting plate.

FIGS. 43-45 depict an alternative base 204a and component mounting plate 226a that can be used with the remainder of the components of the enclosure 200. The base 204a differs from the base 204 in that the first and second path length portions 244, 246 have been eliminated and instead moved to the component mounting plate 226a. The component mounting plate 226a mounts within recess 224a of the base 204a and is retained in the recess 224a by snap-fit retention features such as retention tabs 268a unitarily formed with side walls of the base 204a. Structures such as adapter modules 232 for holding fiber optic adapters 230 and component holding modules 240 can be mechanically coupled to the component mounting plate 226a by mechanical connection interfaces that may include slots and mating connection members (see FIGS. 46 and 47). At least sections of the first and second path width portions 252, 254 are also integrated with the component mounting plate 226a. The interior cover 270 can seat on fiber guide walls of the first and second path length portions 244, 246 and can be retained within the base 204a by snaps 290. The fiber guide walls of the first and second path length portions 244, 246 can be straight while fiber guide walls of the first and second path width portions 252, 254 can be curved. The path length and width portions can include fiber retention tabs that extend over the fiber routing regions defined by the fiber path length and width portions.

Example sealing gels can include cross-linked rubber gels. Example sealing gels can include styrenic block copolymers (e.g., di-block and tri-block copolymers) such as cross-linked styrene-butadiene-styrene (SBS) family thermo-plastic elastomer (TPE) gels. Example sealing gels can include including extended (e.g., oil extended) co-polymer gels such as gels having a composition that includes di-block and/or tri-block co-polymers (e.g., hard-elastomer-hard block co-polymers such as styrene-(ethylene/propylene)-styrene (SEPS) and/or styrene-(ethylene/butylene)-styrene (SEBS) block co-polymers). Example sealing gels can include gels (e.g., silicone gels and other gels) of the type disclosed at U.S. Provisional Patent Application Ser. No. 63/013,992 which is hereby incorporated by reference in its entirety.

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. An enclosure comprising:
    an elongate housing having a length that extends between opposite first and second ends, the elongate housing including first and second housing parts that cooperate to enclose an interior of the housing, the first and second housing parts being movable relative to one another to open and close the elongate housing;
    a perimeter seal that provides sealing between the first and second housing parts when the first and second housing parts are in a closed position;
    a cable pass-through location provided at the second end of the elongate housing;
    a cable sealing arrangement at the second end of the elongate housing for sealing around cables routed through the cable pass-through location;
    a cable anchoring region located at the first housing part for anchoring cables routed through the cable pass-through location;

a component mounting region located at the first housing part between the cable anchoring region and the first end of the elongate housing;

at least one fiber optic adapter that mounts at the component mounting region, the at least one fiber optic adapter including a first connector port that faces at least partially toward the first end of the elongate housing and a second connector port that faces at least partially toward the second end of the elongate housing;

a component holder that mounts at the component mounting region adjacent to the at least one fiber optic adapter;

a first fiber loop storage path defined within the first housing part at a first level, the first fiber loop storage path surrounding the component mounting region and including first and second path length portions that extend along the length of the elongate housing respectively adjacent opposite first and second sides of the elongate housing, the first fiber loop storage path also including first and second path width portions that extend across a width of the elongate housing between the first and second path length portions, the first path width portion being adjacent the first end of the elongate housing and the second path width portion being adjacent the cable anchoring region; and a cover for covering the first fiber loop storage path and the component mounting region, the cover being configured to block access to the first connector port of the at least one fiber optic adapter when the cover is mounted to the first housing part, the cover including a vaulted portion corresponding to the at least one fiber optic adapter to provide clearance for accommodating a fiber optic connector inserted in the first connector port, the cover including a second fiber loop storage path provided at a second level separated from the first level by the cover when the cover is mounted to the first housing part, the second fiber loop storage path including first and second path length portions that generally overlay the first and second path length portions of the first fiber loop storage path when the cover is mounted to the first housing part, the second fiber loop storage path also including a first path width portion that generally overlays the first path width portion of the first fiber loop storage path when the cover is mounted to the first housing part.

2. The enclosure of claim 1, wherein the component mounting region includes at least two fiber optic adapters.

3. The enclosure of claim 1, wherein the cover includes a portion adapted to cover the second path width portion of the first fiber loop storage path and to extend beneath a space dedicated for accommodating the fiber optic connector inserted into the second connector port of the at least one fiber optic adapter.

4. The enclosure of claim 1, wherein the first fiber loop storage path stores coated or buffered optical fibers that are not protected by an additional cable jacket, and the second fiber loop storage path stores coated or buffered optical fibers that are not protected by an additional cable jacket.

5. The enclosure of claim 1, wherein the first fiber loop storage path stores first optical fibers having a first degree of protection, wherein the second fiber loop storage path stores second optical fibers having a second degree of protection, and wherein the second degree of protection is more robust than the first degree of protection.

6. The enclosure of claim 1, wherein the second fiber loop storage path is defined at least in part by a plurality of fiber retention fingers positioned at locations along the first and second path length portions and the first path width portion of the second fiber loop storage path.

7. The enclosure of claim 6, wherein the fiber retention fingers extend at least partially over the second fiber loop storage path and define fiber guides through which optical fibers can extend.

8. The enclosure of claim 1, wherein the first and second path length portions of the first fiber loop storage path are defined at least in part by guide walls spaced inwardly from the first and second sides of the elongate housing that are unitarily formed with a base portion of the first housing part or are integrated with a component mounting plate for mounting the component holder and the at least one fiber optic adapter at the component mounting region.

9. The enclosure of claim 8, wherein the cover seats on the guide walls.

10. The enclosure of claim 9, wherein the cover is retained on the guide walls by retention features unitarily formed with the first and second sides of the elongate housing.

11. The enclosure of claim 8, wherein the first fiber loop storage path includes fiber retention tabs that overhang the first fiber loop storage path.

12. The enclosure of claim 8, wherein the second path width portion of the first fiber loop storage path is defined at least in part by fiber guides positioned at spaced-apart locations positioned between the first and second sides of the elongate housing, the fiber guides being unitary with the base portion of the first housing part or integrated with the component mounting plate, and wherein the first path width portion is defined by an end of the base portion of the first housing part or by a fiber guide integrated with the component mounting plate.

13. The enclosure of claim 8, wherein the fiber optic adapter is part of an adapter module, wherein the adapter module and the component holder are configured to be secured to the component mounting plate, wherein the component mounting plate mounts within a recess defined in the base portion of the first housing part, and wherein the component mounting plate is retained in the recess by retaining projections that are unitarily formed with the first housing part.

14. The enclosure of claim 1, wherein the cover does not block access to the second connector port of the fiber optic adapter when the cover is mounted to the first housing part.

15. The enclosure of claim 1, wherein the first and second connector ports of the at least one fiber optic adapter are positioned between the first and second path length portions of the second fiber loop storage path.

16. A cable anchoring device adapted to be secured to a mounting plate having an arrangement of mounting features, the cable anchoring device comprising:

a sheet metal unit including first and second cable anchoring locations interconnected by a central portion of the sheet metal unit that extends between the first and second cable anchoring locations, each of the first and second cable anchoring locations including: a) a set of opposing blades adapted to embed in the jacket of a cable; b) a closed ended pocket forming a strength member stop for limiting pistoning of a strength member of the cable; and c) a cable tie location;

the sheet metal unit also including first and second latches positioned respectively beneath the first and second cable anchoring locations for securing the sheet metal unit to the mounting plate.

17. The cable anchoring device of claim 16, wherein the first and second cable anchoring locations are symmetric about a central plane that bisects the sheet metal unit.

18. An enclosure comprising:
- an elongate housing having a length that extends between opposite first and second ends, the elongate housing including first and second housing parts that cooperate to enclose an interior of the housing, the first and second housing parts being movable relative to one another to open and close the elongate housing;
- a perimeter seal defined between the first and second housing parts when the first and second housing parts are in a closed position;
- a cable pass-through location provided at the second end of the elongate housing;
- a hinge provided at the first end of the elongate housing for allowing the first and second housing parts to be pivoted between the closed and open positions;
- a cable sealing arrangement at the second end of the elongate housing for sealing the second end of the enlongate housing and for sealing around cables routed through the cable-pass-through location, the cable sealing arrangement including a first sealing block mounted to the first housing part and a second sealing block mounted to the second housing part, wherein a cable sealing interface is defined between the first and second sealing blocks;
- a cable anchoring region located at the first housing part for anchoring cables routed through the cable pass-through location to the first housing part;
- a component mounting region located at the first housing part between the cable anchoring region and the first end of the elongate housing;
- at least one fiber optic adapter that mounts at the component mounting region, the fiber optic adapter including a first connector port that faces at least partially toward the first end of the elongate housing and a second connector port that faces at least partially toward the second end of the elongate housing;
- a first fiber loop storage path defined within the first housing part at a first level, the first fiber loop storage path surrounding the component mounting region and including first and second path length portions that extend along the length of the elongate housing respectively adjacent opposite first and second sides of the elongate housing; and
- a cover for covering the first fiber loop storage path and the component mounting region, the cover being configured to block access to the first connector port of the at least one fiber optic adapter when the cover is mounted to the first housing part, the cover including a vaulted portion corresponding to the fiber optic adapter to provide clearance for accommodating a fiber optic connector inserted in the first connector port, the cover including a second fiber loop storage path provided at a second level separated from the first level by the cover when the cover is mounted to the first housing part, the second fiber loop storage path including first and second path length portions that generally overlay the first and second path length portions of the first fiber loop storage path when the cover is mounted to the first housing part.

19. The enclosure of claim 18, wherein the cable anchoring region includes a module mounting plate secured to the first housing part, the module mounting plate defining a grid pattern of openings; and
- a cable anchoring module that mounts at the cable anchoring region, the cable anchoring module including a first attachment feature that interlocks with the grid pattern and a second attachment feature that interlocks with an inner containment wall.

* * * * *